United States Patent
Nagata

(10) Patent No.: US 7,462,146 B2
(45) Date of Patent: Dec. 9, 2008

(54) ROLLER MEMBER, AND PROCESS FOR ITS MANUFACTURE

(75) Inventor: Yukinori Nagata, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 10/922,955

(22) Filed: Aug. 23, 2004

(65) Prior Publication Data

US 2005/0049127 A1    Mar. 3, 2005

(30) Foreign Application Priority Data

Aug. 29, 2003    (JP) .............................. 2003-305846

(51) Int. Cl.
*A01B 29/00*    (2006.01)
*B21K 1/02*    (2006.01)

(52) U.S. Cl. .............................. 492/30; 492/31; 492/35; 492/36; 492/56

(58) Field of Classification Search .................... 492/30, 492/31, 34, 35, 36, 48, 56, 57
See application file for complete search history.

(56) References Cited

U.S. PATENT DOCUMENTS

| 5,110,705 | A | * | 5/1992 | Hosoya et al. | 430/123.58 |
| 5,424,813 | A | * | 6/1995 | Schlueter et al. | 399/239 |
| 5,768,668 | A | * | 6/1998 | Shiraki et al. | 399/281 |
| 5,824,408 | A | | 10/1998 | Kume et al. | 428/323 |
| 5,930,570 | A | * | 7/1999 | Saito et al. | 399/279 |
| 6,023,597 | A | | 2/2000 | Mayuzumi et al. | 399/176 |
| 6,149,564 | A | * | 11/2000 | Nozawa et al. | 492/30 |
| 6,256,471 | B1 | * | 7/2001 | Sato et al. | 399/284 |
| 6,372,347 | B1 | * | 4/2002 | Yamaguchi et al. | 428/403 |
| 6,572,516 | B2 | * | 6/2003 | Clarke et al. | 492/30 |
| 6,640,073 | B2 | * | 10/2003 | Kurotori et al. | 399/237 |
| 6,810,227 | B2 | * | 10/2004 | Sakata et al. | 399/281 |
| 6,829,460 | B2 | * | 12/2004 | Kurotori et al. | 399/237 |
| 7,003,248 | B2 | * | 2/2006 | Kurotori et al. | 399/249 |
| 7,171,141 | B2 | * | 1/2007 | Abe et al. | 399/176 |
| 7,206,539 | B2 | * | 4/2007 | Kawahara et al. | 399/281 |
| 2002/0072458 | A1 | * | 6/2002 | Clarke et al. | 492/37 |
| 2003/0190547 | A1 | * | 10/2003 | Kobayashi et al. | 430/125 |
| 2004/0105702 | A1 | * | 6/2004 | Kurotori et al. | 399/237 |
| 2006/0039721 | A1 | * | 2/2006 | Shiomura et al. | 399/286 |
| 2006/0111223 | A1 | * | 5/2006 | Chou | 492/37 |

FOREIGN PATENT DOCUMENTS

JP    09068860 A    *    3/1997

(Continued)

*Primary Examiner*—Essama Omgba
(74) *Attorney, Agent, or Firm*—Fitzpatrick, Cella, Harper & Scinto

(57) ABSTRACT

In a roller member having at least a mandrel and a conductive elastic layer provided on the peripheral surface of the mandrel, the roller member has a surface roughness Rz jis 94 of from 0.5 μm to 10 μm, and the roller member contains voids in the vicinity of its surface. Substantially all of the voids have an average internal diameter of from 10 μm to 400 μm and an aspect ratio of from 1.3 or more to 10.0 or less, and having an angle of from 0° or more to 45° or less as an acute angle between an axis that takes the maximum internal diameter of each of the voids and a tangent to a concentric circle of the roller member at the center of each of the voids.

1 Claim, 11 Drawing Sheets

FOREIGN PATENT DOCUMENTS

| JP | 9-297454 | 11/1997 |
| JP | 2002-196566 | 7/2002 |
| JP | 2003-186298 | 7/2003 |
| JP | 2005099776 A * | 4/2005 |

* cited by examiner

US 7,462,146 B2

ROLLER MEMBER, AND PROCESS FOR ITS MANUFACTURE

BACKGROUND OF THE INVENTION

1. Field of the Invention

This invention relates to a roller member having a conductive (or semiconductive) elastic layer, which is preferably usable as a charging or transfer roller, a developing roller, a transport roller, a fixing roller, an intermediate transfer roller or the like used in image forming apparatus utilizing an electrophotographic process, such as electrophotographic apparatus, and also relates to a process for its manufacture.

2. Related Background Art

FIG. 1 diagrammatically illustrates the constitution of an electrophotographic apparatus having a contact charging means and a contact transfer means. Reference numeral 1 denotes a drum type photosensitive member comprising a conductive support made of, e.g., aluminum, and provided on its peripheral surface a photoconductive layer. Reference numeral 2 denotes a charging roller which is in contact with this photosensitive member and charges the surface of the photosensitive member to a stated potential.

This charging roller is kept in pressure contact with the photosensitive member 1 at a stated pressure by a pressure contact means (not shown) such as springs, and is followingly rotated as the photosensitive member 1 is rotated in the direction of an arrow A. Also, a DC and AC (or only DC) bias is applied to this charging roller to charge the photosensitive member 1 to a stated potential. That is, in order to obtain good copied images, it is necessary for the charging roller 2 to be in the state of uniform contact with the photosensitive member 1 and have conductivity. The surface of the photosensitive member 1 charged to a stated potential by the charging roller 2 is exposed to imagewise modulated exposure light 3 emitted from an exposure means (not shown) such as a laser or an an LED (light-emitting diode), whereupon an electrostatic latent image corresponding to the intended image information is formed on the photosensitive member 1.

Subsequently, the electrostatic latent image formed is rendered visible as a toner image by a developing means 4 having a developing roller 401. This toner image on the surface of the photosensitive member 1 is transferred to a transfer material 6 on its surface side by charging the transfer material 6 on the back thereof to a polarity reverse to that of the toner by means of a transfer roller 5. The transfer material 6 to which the toner image has been transferred is separated from the photosensitive member 1, and then the toner image on the transfer material 6 is fixed to the transfer material 6 by a fixing member 7 by the action of heat and pressure. Also, from the surface of the photosensitive member 1 from which the toner image has been transferred, deposits such as residual toner at the time of transfer are removed by a cleaning member 8 to make the surface clean. Thus, the photosensitive member 1 is repeatedly used for image formation. In FIG. 1, reference numeral 9 denotes a toner.

Roller members such as the charging roller 2, the transfer roller 5 and the developing roller 401 are each constituted of at least a mandrel supported rotatably on its both ends and an elastic layer having a conductivity (semiconductivity) of about $1\times10^3$ to $1\times10^{10}$ Ω·cm as volume resistivity, provided on the peripheral surface of the mandrel. Such an elastic layer is produced using a rubber composition containing a conductive rubber or a rubber with conductive particles dispersed therein, and a vulcanizing agent and optionally containing a vulcanization accelerator and so forth, and by extruding the rubber composition into a roller in such a way that it covers the peripheral surface of the mandrel, and thereafter vulcanizing the rubber. However, air bubbles (hereinafter "voids") may be produced in the elastic layer as a result of the evaporation of water incorporated in the rubber or rubber composition, caused by the heat at the time of vulcanization.

A roller member to the elastic layer surface of which such voids have come exposed to make the elastic layer have concavities on its surface may cause faulty images when it is used in the electrophotographic process. For example, where such a roller is used as the charging roller, the charging roller may cause faulty charging at the concavities to cause faulty images as a result of it. Such faulty images caused by voids may occur even where the elastic layer surface has been subjected to modification treatment such as irradiation with ultraviolet light, irradiation with electron rays or impregnation with a surface treatment solution. Also, especially where a surface coat layer is formed on the elastic layer by coating, even if the voids standing exposed to the elastic layer surface are microscopic, their presence on the elastic layer surface may cause large crater-like defects on the surface coat layer which have grown from the voids as nuclei. Such a phenomenon has been seen. Then, such voids may remarkably occur especially in using an ion-conductive rubber having a polar group in the molecule. This is considered due to the fact that the polar group tends to adsorb water molecules.

To solve such problems, a method is proposed in which a rubber is compounded with a dehydrating agent which removes water content of unvulcanized rubbers, as exemplified by calcium oxide (see, e.g., Japanese Patent Application Laid-Open No. H09-297454). However, the dehydrating agent such as calcium oxide has a poor dispersibility in rubbers, and also the compounding of rubber with the dehydrating agent may make the elastic layer have a high hardness.

SUMMARY OF THE INVENTION

Accordingly, an object of the present invention is to obtain a roller member having good surface properties while tolerating the presence of voids in the elastic layer. Then, for such an object, the present inventors have made various studies. As the result, they have discovered that a form may be pressed against the surface of a rubber composition extruded around a mandrel, in the state of which the rubber in the rubber composition is vulcanized, whereby a roller member having very good surface properties can be obtained even though the voids are present in the elastic layer, without any influence thereof on the surface properties of the roller member. Thus, they have accomplished the present invention.

The present invention provides the following (1) roller member and (2) process for its manufacture.

(1) The roller member according to an embodiment of the present invention is a roller member having at least a mandrel and a conductive elastic layer therearound;

the roller member having a surface roughness Rz jis 94 of from 0.5 μm to 10 μm; and the roller member containing voids in the vicinity of its surface, wherein substantially all of the voids have an average internal diameter of from 10 μm to 400 μm and an aspect ratio of from 1.3 or more to 10.0 or less, and have an angle of from 0° or more to 45° or less, the angle being an acute angle between an axis that takes the maximum internal diameter of each of the voids and a tangent to a concentric circle of the roller member at the center of each of the voids.

(2) The roller member manufacturing process according to another embodiment of the present invention is a process for manufacturing a roller member comprising a mandrel and an elastic layer having a stated surface roughness around the mandel; the process comprising the steps of:

(i) producing an unvulcanized rubber roller comprising the mandrel and a layer containing an unvulcanized conductive rubber composition therearound; and (ii) pressing a form having a surface roughness corresponding to the stated surface roughness, against the surface of the layer containing an unvulcanized conductive rubber composition, in the state of which the rubber in the unvulcanized conductive rubber composition is vulcanized to form the elastic layer, wherein the step (ii) is carried out while changing the place at which the form is pressed against the surface of the layer containing an unvulcanized conductive rubber composition.

Preferred embodiments of the above roller member manufacturing process may include the following (3) and (4).

(3) The roller member manufacturing process described in the above (2), in which the rubber composition in the step (i) has a Mooney viscosity of from 15 to 55.

(4) The roller member manufacturing process described in the above (2), in which the form used in the step (ii) has a breadth which is larger than the breadth of the elastic layer to be formed.

DESCRIPTION OF THE PREFERRED EMBODIMENTS

The present invention is described below in detail.

Figure 1:
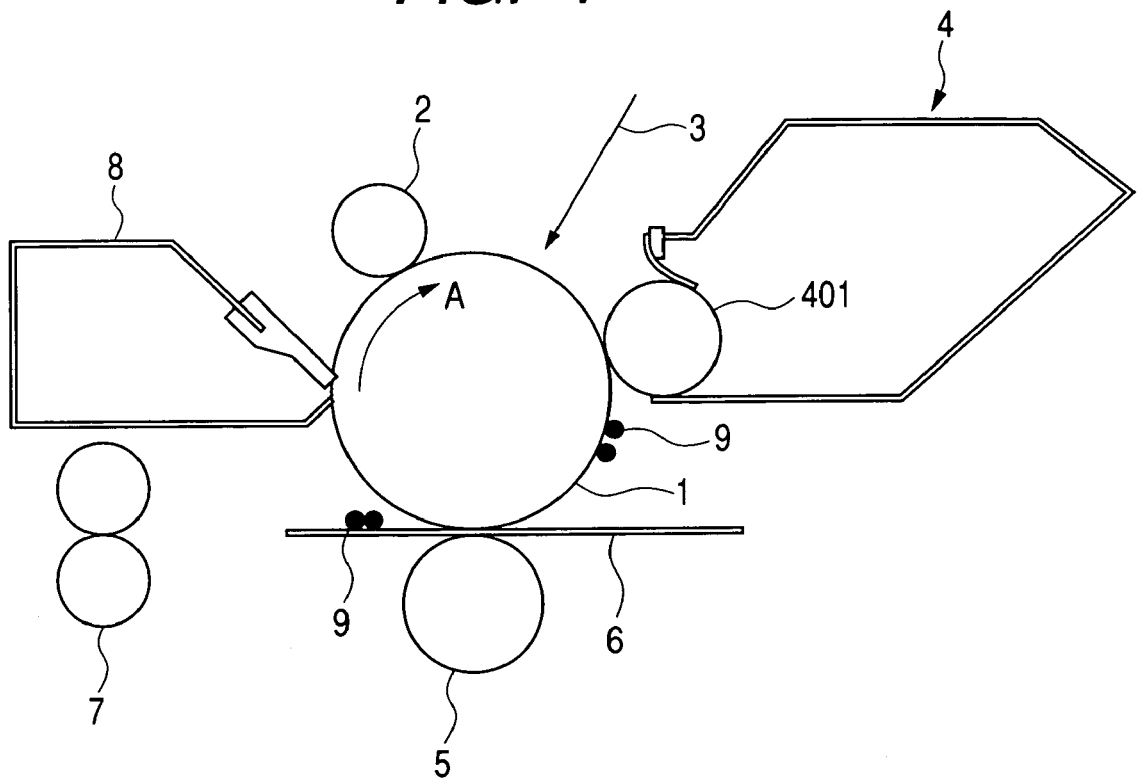
FIG. 1 is a diagrammatic view of an electrophotographic apparatus making use of contact charging and transfer rollers.
Figure 2A:
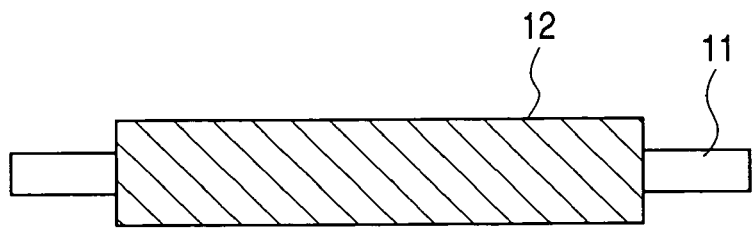
FIG. 2A is a front view of the roller member according to the present invention.
Figure 2B:
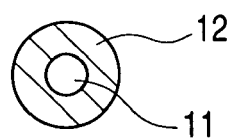
FIG. 2B is a sectional view afforded when the roller member is cut in the direction that falls at right angles with its mandrel.
Figure 2C:
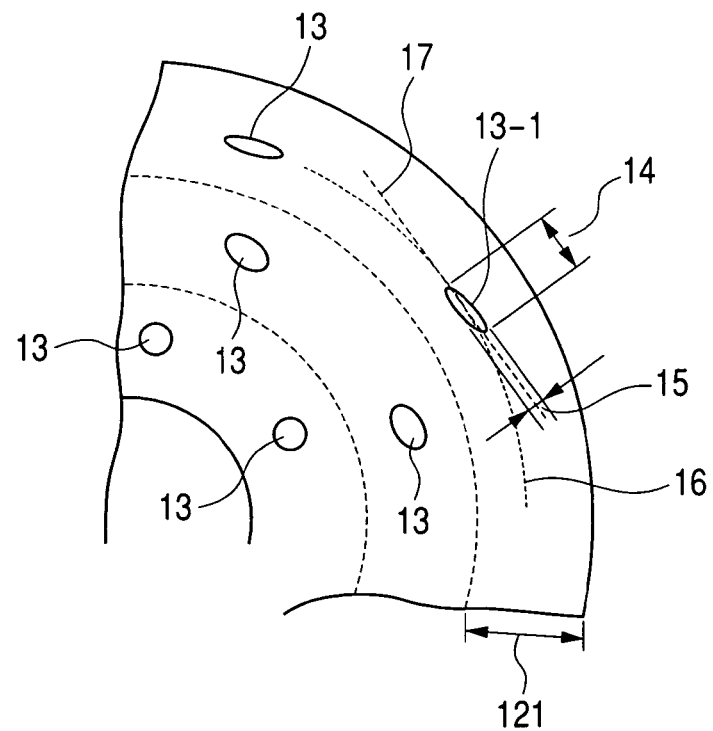
FIG. 2C is a partial enlarged view of an elastic layer of the roller member shown in FIG. 2B.
Figure 2D:
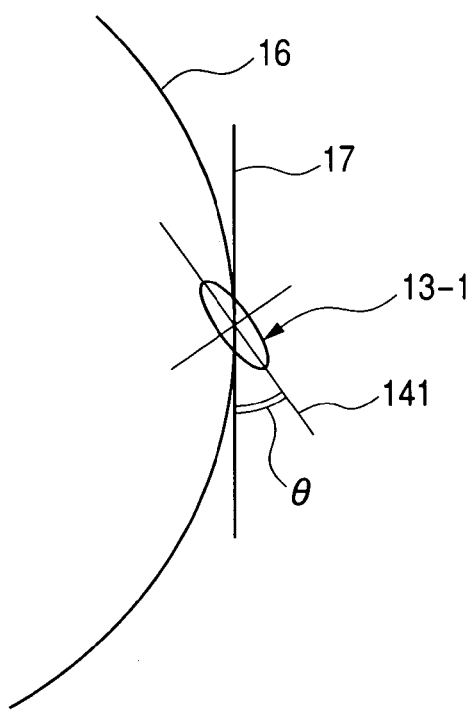
FIG. 2D is an enlarged view of a void positioned in the vicinity of the surface of the elastic layer of the roller member shown in FIG. 2B.

(1) Roller Member:

FIG. 2A is a front view of the roller member according to the present invention. In FIG. 2A, reference numeral 11 denotes a mandrel; and 12, an elastic layer constituting a surface layer of the roller member, formed on the peripheral surface of the mandrel 11. FIG. 2B is a sectional view afforded when the roller member shown in FIG. 1 is cut in the direction that falls at right angles with the mandrel 11. FIG. 2C is a partial enlarged view of the sectional-view elastic layer shown in FIG. 2B. In FIG. 2C, 13 denotes voids standing exposed to a cross section afforded when the elastic layer 12 is cut in the direction that falls at right angles with the mandrel. Further, FIG. 2D is an enlarged view of a void 13-1 shown in FIG. 2C and the vicinity thereof.

The roller member according to a first embodiment of the present invention is a roller member having at least a mandrel and a conductive elastic layer provided on the peripheral surface of the mandrel. The elastic layer has a surface roughness Rz jis 94 of from 0.5 μm to 10 μm. The elastic layer contains voids in the vicinity of its surface, and substantially all of the voids have an average internal diameter of from 10 μm to 400 μm and an aspect ratio of from 1.3 or more to 10.0 or less, and have an angle of from 0° or more to 45° or less, said angle being an acute angle θ between an axis (141 in FIG. 2D) that takes the maximum internal diameter of each of the voids and a tangent (17 in FIG. 2D) to a circle (16 in FIG. 2D) that is concentric with the roller member at the center of each of the voids.

Here, the Rz jis 94 that defines the surface roughness of the elastic layer of the roller member is the value found according to Japan Industrial Standard (JIS) B 0601 (1994). In the present invention, the standard length and the cut-off wavelength which are used for calculating the Rz jis 94 is set to be 8 mm and 0.8 mm, respectively. The "vicinity of surface" of the elastic layer also refers to a region that is 33% inside from the surface with respect to the thickness of the elastic layer (a region 121 in FIG. 2C). The voids also refer to empty spaces appearing on the cut surface of the elastic layer when the elastic layer is cut in the direction that falls at right angles with the mandrel. The "average internal diameter" of the voids is defined to be the value found when the sum of the maximum internal diameter (14 in FIG. 2C) of each void and the minimum internal diameter (15 in FIG. 2C) of each void is multiplied by ½. The "center" of each void refers to the point of intersection of a length and a breadth of an ellipse given when each void is approximated to an ellipse. Here, the approximation of voids to ellipses is one made by reading coordinates of boundary points from an image obtained by enlarging the voids on a non-contact laser microscope (1LM-21, manufactured by Lasertec Corporation), and by using the method of least squares. As to coordinate data of the boundary points, it is preferable to use at least 10 points.

Incidentally, the elastic layer in the present invention is not what embraces a foamed layer in which voids have intentionally been formed using a blowing agent or the like, but what is presupposed to be a solid elastic layer having a void volume of 10% or less.

Thus, substantially all of the voids contained in the vicinity of the surface of the elastic layer according to the present invention have an average internal diameter of from 10 μm or more to 400 μm or less, and preferably from 10 μm or more to 100 μm or less, and an aspect ratio of from 1.3 or more to 10.0 or less, preferably from 1.3 or more to 4.0 or less, and particularly from 1.8 or more to 3.2 or less. They also have an angle of from 0° or more to 45° or less, and preferably from 0° or more to 30° or less, and the angle is an acute angle θ between an axis (141 in FIG. 2D) that takes the maximum internal diameter of each of the voids and a tangent (a segment 17 in FIG. 2D) at the center of each of the voids to a concentric circle of the mandrel peripheral surface, passing through the center of each of the voids, i.e., a circle (an arc 16 in FIG. 2D) that is concentric with the roller member, passing through the center of each of the voids. Employment of such constitution brings the effect that, even where the voids are present in the vicinity of the surface of the elastic layer, the influence the voids may have on the surface roughness of the roller member can vastly be relieved because the shape, and the state of alignment, of the voids have been regulated, to provide the roller member having the good surface properties that the Rz jis 94 is 0.5 μm to 10 μm.

Incidentally, in the present invention, "substantially all of the voids" satisfy the above various parameters. This means that all voids satisfy the above parameter conditions when the roller member is cut at nine points at equal intervals over the whole breadth of its elastic layer and in the direction that falls at right angles with the mandrel, to measure all voids present in the vicinity of the surface of the elastic layer which are observed on the cut surfaces at ten points.

Inasmuch as the voids in the vicinity of the surface of the elastic layer are made to have the shape and the state of alignment which have been controlled in this way, even where openings of voids are present at the elastic layer surface, such voids have been crushed. Hence, faulty images due to voids can be made less occur. Further, even where voids having been present in the vicinity of the surface have come exposed as a result of polishing or the like, what come exposed are nothing but flat voids having likewise been crushed, and the depth of surface openings due to such voids is small. Hence, faulty images due to such openings can be made less occur.

Where a layer which controls resistance and surface properties is provided on the peripheral surface of the elastic layer, in particular, where the layer is provided on a layer at the peripheral surface of which voids are present, by coating it with a coating fluid by a method such as dipping, coating defects which look like marks of bumping also tend to come at the part of voids at the time of heat curing. Such coating defects more tend to come as the depth of voids is larger. However, the roller member according to the present invention also enables reduction of coating defects for the above reasons.

The layer which controls resistance and surface properties may also be provided on the peripheral surface of the elastic layer in which the voids are present. A base layer which controls hardness may also be provided on the inner periphery side of the elastic layer in which the voids are present. Surface treatment making use of irradiation with ultraviolet rays, ozone, electron rays or the like may also be carried out after pressure contact rotation vulcanization described later.

In the roller member according to the present invention, the voids may preferably be at a position of 100 μm or less in depth from the roller member surface, and more preferably 30 μm or less in depth from the elastic roller surface. As long as it is a roller member satisfying the above condition, it can be used as a charging roller disposed in contact with the photosensitive member.

Thus, where the roller member according to the present invention, having no great defects and having uniform surface, is used as the charging roller, uniform images free of faulty images or the like can stably be obtained.

(2) Re Roller Member Manufacturing Process:

A roller member manufacturing process according to a second embodiment of the present invention is described below, which can obtain the roller member described above in which the shape and alignment of the voids in the vicinity of the surface of the elastic layer have been controlled in the specific state and which has the specific surface properties.

The process according to the present invention, which manufacture the roller member comprising the mandrel and the conductive elastic layer provided around it, has the following steps (i) and (ii):

The steps of:

(i) producing an unvulcanized rubber roller having around the mandrel a layer containing an unvulcanized conductive rubber composition; and (ii) pressing a form having a surface roughness corresponding to the stated surface roughness of the elastic layer to be formed, against the surface of the layer containing an unvulcanized conductive rubber composition, in the state of which the rubber in the unvulcanized conductive rubber composition is vulcanized to form the elastic layer.

Then, the step (ii) is carried out while changing the place at which the form is pressed against the surface of the layer containing an unvulcanized conductive rubber composition.

Step (i)

Figure 3A:
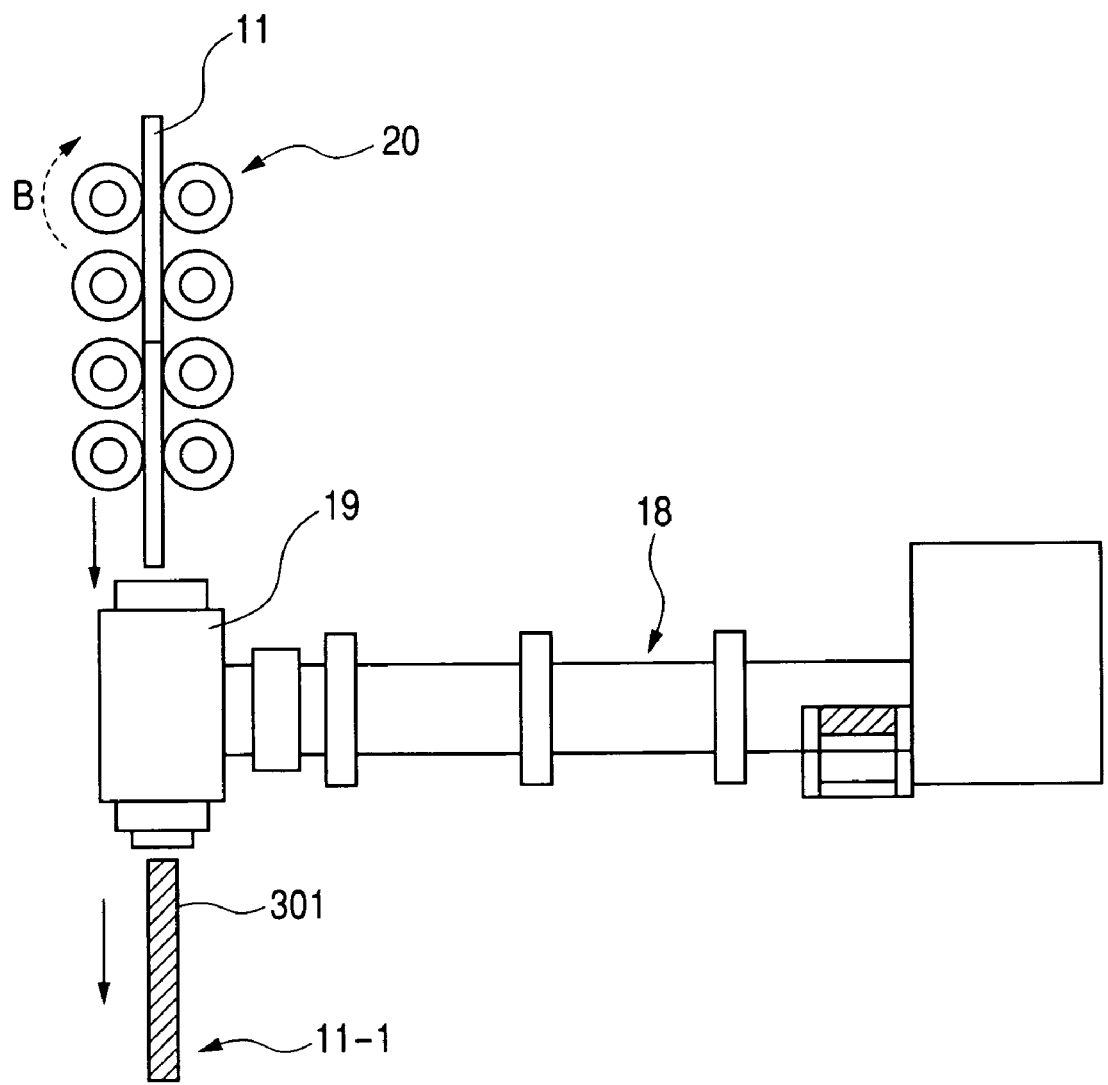
FIG. 3A is a diagrammatic view showing an example of an extruder for carrying out the present invention.
Figure 3B:
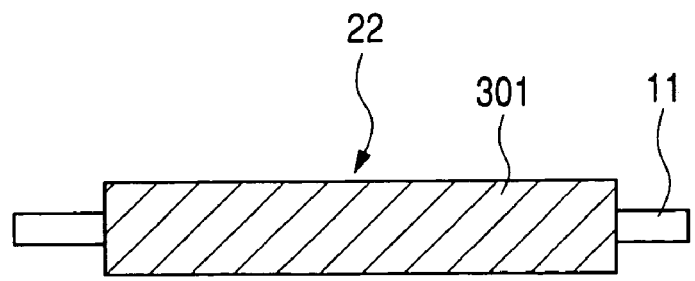
FIG. 3B is a front view of an unvulcanized roller member.

First, an unvulcanized rubber composition prepared by compounding and kneading a polymer raw material and additives is extruded together with the mandrel to cover the mandrel with the unvulcanized rubber composition. FIG. 3A is an illustration showing this step (i) diagrammatically. An extruder 18 has a crosshead 19. To the crosshead 19, a mandrel 11 fed by mandrel feed rollers 20 rotated in the direction of an arrow B is inserted from the back, and a cylindrical unvulcanized rubber composition is integrally extruded simultaneously with the mandrel 11. Thus, a mandrel 11-1 is obtained which has been covered around it with a layer 301 containing the unvulcanized rubber composition. Here, end portions of the unvulcanized rubber composition layer 301 around the mandrel 11-1 are cut away in lengths to obtain an unvulcanized roller 22 (see FIG. 3B).

The polymer raw material used in the present invention may include natural rubber, butadiene rubber, styrene-butadiene rubber (SBR), nitrile rubber, ethylene-propylene rubber (EPDM), chloroprene rubber (CR), nitrile-butadiene rubber (NBR), epichlorohydrin rubber, butyl rubber, silicone rubbers, urethane rubbers, fluorine rubbers and chlorine rubbers.

It may further be a thermoplastic material, or a mixture of a thermoplastic material and a rubber material. In such a case, the material has nothing to do with the progress of vulcanization, and hence a roller may be rotated in pressure contact at a temperature not lower than its melting point, whereby a roller having good surface roughness and shape precision can be obtained.

The unvulcanized rubber composition may also be endowed with conductivity by a method in which a conductive filler is dispersed, or by using a conductive polymer or an ionic conducting agent.

As a conductive filler to be dispersed in the polymer raw material, it may include carbon materials such as black carbon and conductive carbon; and powders of graphite, metal oxides such as $TiO_2$, $SnO_2$ and $ZnO$, double oxides such as a solid solution of $SnO_2$ and $Sb_2O_3$ and a solid solution of $ZnO$ and $Al_2O_3$, and metal powder such as Cu and Ag, any of which may be added in an amount of from 5 to 200 parts by weight based on 100 parts by weight of the polymer raw material.

As a vulcanizing agent, it may include sulfur, metal oxides and organic oxides. As an inorganic filler, it may include carbon black, talc and clay. Other known vulcanization accelerator, process oil and so forth may appropriately be added.

Step (ii)

A form is pressed against the surface of the unvulcanized rubber composition layer 301 with which the peripheral surface of the mandrel is covered, of the unvulcanized roller 22 obtained in the step (i), and also the rubber in the unvulcanized rubber composition is vulcanized while changing the place at which the form is pressed against the surface of the unvulcanized rubber composition layer 301. Here, the form is meant to be one having surface roughness corresponding to the stated surface roughness the elastic layer should have, and the form transfers its surface properties to the unvulcanized rubber composition layer in the present step. Also, inasmuch as the form is pressed against the unvulcanized rubber composition layer at a stated pressure and also the rubber is vulcanized while changing the place at which the form is pressed against the unvulcanized rubber composition layer, even though voids have formed in the vicinity of the surface of the elastic layer, the shape and alignment of the voids can be controlled. More specifically, in the step of vulcanization, the unvulcanized rubber composition is heated, and a pressure is applied to the unvulcanized rubber at such timing that its viscosity lowers with its heating. Hence, rough portions of the surface and openings of the voids can readily be crushed. Moreover, as to its external diameter as well, the changing of the place at which the form is pressed against it can make it free of blistering at its end portions at the time of extrusion. Accordingly, compared with a case of extrusion only, the surface roughness is vastly improved to make it possible to obtain a highly precise roller member free of surface defects.

Figure 4A:
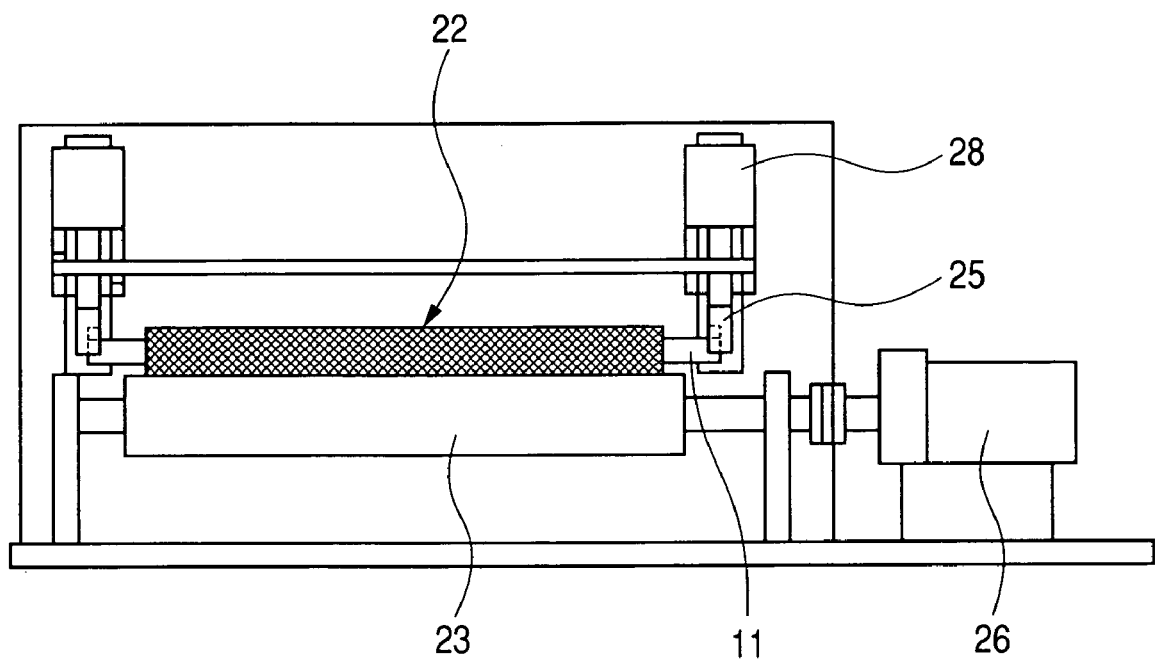
FIG. 4A is a front view of a pressure contact vulcanizing apparatus having a cylindrical pressure contact member for carrying out the present invention.
Figure 4B:
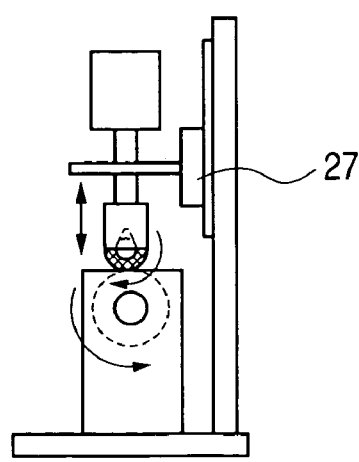
FIG. 4B is a schematic side view of the vulcanizing apparatus shown in FIG. 4A.

FIG. 4A is a front view of a pressure contact vulcanizing apparatus having a cylindrical form (pressure contact member) held rotatably, which is used in this step (ii). FIG. 4B presents its side view.

The cylindrical pressure contact member 23 being rotated and the central axis of the unvulcanized roller 22 are held in parallel. Holding members 25 for applying pressure are kept in pressure contact with the portions where the mandrel 11 stands exposed at both end portions of the unvulcanized roller 22, to hold the roller 22 so that its shaft is not shifted right and left.

The pressure contact member 23 may internally be provided with a heater so as to be beforehand heated to vulcanization temperature, or the whole apparatus may be installed in a thermostatic chamber so that the whole can be kept at vulcanization temperature, or the both may be done simultaneously. Also, the temperature of the pressure contact member 23 may be made higher than the environmental temperature to provide a difference in temperature between the pressure contact member 23 and the environment.

Incidentally, in order to make vulcanization proceed simultaneously, heating temperature may preferably be 140° C. or more to 220° C. or less, at which the vulcanization of rubber may readily proceed.

The pressure contact member 23 may further be rotated by a motor 26 to make the unvulcanized roller 22 rotate followingly. The holding member 25 on the mandrel 11 is supported by a rail 27 readily movable in the vertical direction so that it can follow up any changes in external diameter of the unvulcanized roller 22. Pressing force is also adjustable by changing the weight of a weight 28.

If the unvulcanized rubber composition layer has a thickness of less than 0.25 mm, the pressure contact member and the mandrel supporting the unvulcanized rubber composition layer may interfere because of deformation of the unvulcanized rubber composition layer, incident to the application of pressure, or the layer may provide no margin sufficient for the voids to be crushed. Accordingly, the unvulcanized rubber composition layer may preferably have a thickness of 0.25 mm or more. Also, in order to make the unvulcanized roller compact, the unvulcanized rubber composition layer may preferably have a thickness of 20 mm or less.

If the unvulcanized rubber composition has too low viscosity, it may deform so greatly at the time of pressure contact that the unvulcanized roller can not maintain its cylindrical shape with its rotation. If on the other hand the unvulcanized rubber composition has too high viscosity, the crush of voids does not sufficiently take place with pressure contact rotation of the unvulcanized roller, and hence the effect of the present invention can not sufficiently be obtained.

Accordingly, in order to obtain a roller member having a good precision and free of any surface defects or the like, it is preferable for the unvulcanized rubber composition to have a Mooney viscosity of from 15 or more to 55 or less. Here, as to the Mooney viscosity of the unvulcanized rubber composition, a Mooney viscosity test is conducted according to JIS K 6300. In this Mooney viscosity test, an L-shaped rotor is used, and the test is conducted under conditions of a preheating time of 1 minute, a rotor rotational time of 4 minutes and a test temperature of 100° C.

The pressure contact member is further described below.

As materials for the pressure contact member, metals having good thermal conductivity are preferred. Also, since the pressure contact member serves as a form to make its surface properties transfer to the unvulcanized rubber composition layer, it has a surface roughness corresponding to the surface roughness the surface of the roller member should have.

The surface roughness is measured by the method which accords with the evaluation of ten-point average roughness (Rz jis) in JIS B 0601. Here, as the surface roughness of the pressure contact member, it may preferably be from 0.5 µm or more to 3.2 µm or less, and more preferably from 0.5 µm or more to 0.8 µm or less, as Rz jis. In order to attain the desired roughness, the surface may also be made rough to substantially the same extent as the desired roughness.

The pressure contact member may also be subjected to surface treatment. In order that the unvulcanized rubber can not easily adhere to the pressure contact member in the step (ii), usable are plating such as chromium plating, nickel plating or fluorine-containing nickel plating, as well as fluorine coating, or fluorine resin or silicone resin coating. Also, the pressure contact member may be coated with a fluorine type or silicone type release agent. Other known metal surface treatment may also be used.

As to the breadth (or length) of the pressure contact member, it is preferable to use a member having as shown in FIG.

4A a breadth larger than the breadth of the rubber portion, i.e., the elastic layer, of the unvulcanized roller.

More specifically, a cylindrical member having a length larger than the length of the unvulcanized rubber composition layer 301 of the unvulcanized roller 22 may be used as the pressure contact member, and the unvulcanized roller 22 is brought into pressure contact with the pressure contact member while effecting vulcanization. Thus, any marks given at the moment the pressure contact member is pulled apart from the roller member by no means remain because the vulcanization of the surface has proceeded at the point in time the former is pulled apart from the latter.

Incidentally, as the cylindrical pressure contact member, a hollow cylindrical member having an internal diameter larger than the external diameter of the unvulcanized roller may be used, where the latter is rotated while being brought into pressure contact with the internal peripheral surface of the former, to effect vulcanization.

Where a pressure contact member having a breadth smaller than the breadth of the rubber portion, i.e., the elastic layer, of the unvulcanized roller is used, it is preferable that at least one of the mandrel and the pressure contact member is rotated, during which it is relatively moved in the lengthwise direction to continuously shift the place to be pressed, of the rubber portion of the unvulcanized roller so that any marks of pressure application may not remain in the elastic layer after vulcanization.

In this case, as relative feed rate between the pressure contact member and the mandrel, the rate of movement may be so controlled that, upon heating, the vulcanization of the unvulcanized roller surface proceeds enough to make any marks not remain there. Besides, the feed rate may be made higher to make reciprocal movement.

An unvulcanized roller having a multiple layer which has simultaneously formed at the time of extrusion may be used, and may be put to pressure contact rotation vulcanization to obtain a multi-layer roller as will be detailed later. A roller member having been vulcanized and then covered with unvulcanized rubber as its outermost layer may also be used, and may be put to pressure contact rotation vulcanization.

In FIGS. 4A and 4B, what is shown is an embodiment in which a cylindrical form is used as the pressure contact member so that the pressure contact surface of the unvulcanized rubber composition layer against the form has a curved (concave) shape. However, a plane member may be used as the form so that the pressure contact surface of the unvulcanized rubber composition layer against the form has a plane shape.

In order to concretely make the pressure contact surface of the unvulcanized rubber composition layer against the pressure contact member have a plane shape, a flat-plate member may be used as the pressure contact member. A flat plate having a breadth larger than the length corresponding to rubber length of the unvulcanized roller may be used as the pressure contact member, and the unvulcanized roller 22 may be rolled on the flat plate under pressure contact, whereby the pressure can be applied while changing its position continuously. Where the length of the pressure contact member of this embodiment in the direction where it is rolled is set large, a large number of rollers can continuously be rolled under pressure contact. Hence, this enables improvement in mass productivity. Such constitution is described in greater detail with reference to FIGS. 5A and 5B.

Figure 5A:
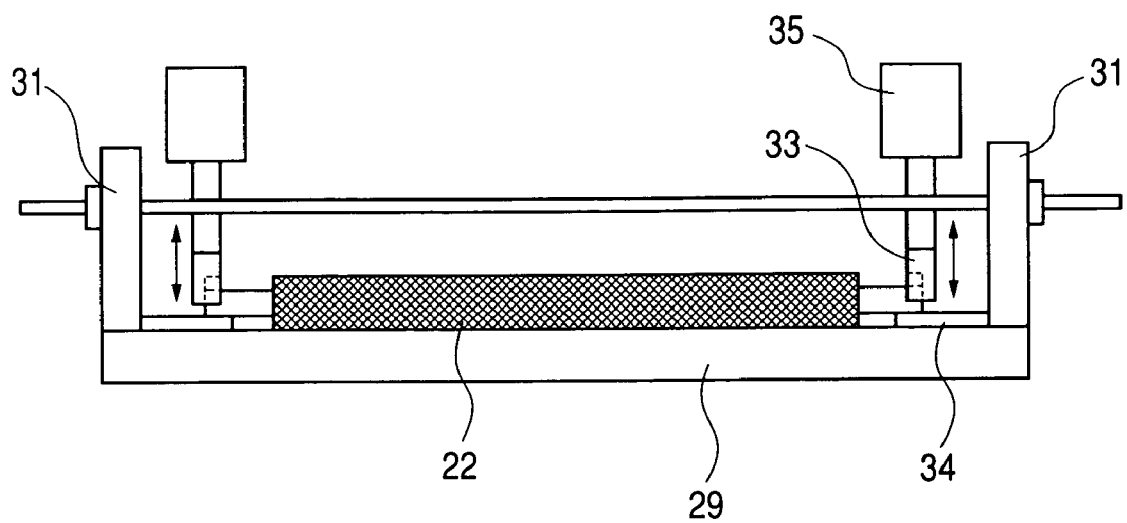
FIG. 5A is a front view of a pressure contact vulcanizing apparatus having a flat-plate pressure contact member for carrying out the present invention.
Figure 5B:
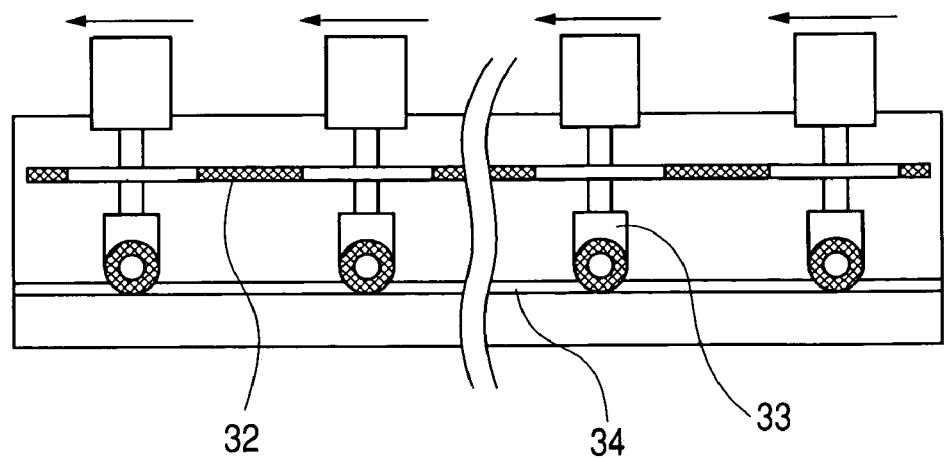
FIG. 5B is a schematic side view of the vulcanizing apparatus shown in FIG. 5A.

FIG. 5A is a front view of a pressure contact vulcanizing apparatus having a flat-plate pressure contact member. FIG. 5B is its side view.

A pressure contact member 29 is a flat plate larger in breadth than the unvulcanized rubber composition layer formed around the mandrel, and is provided on both sides with guides 31 so that unvulcanized rollers 22 can be rolled on in the lengthwise direction while being brought into pressure contact with the flat plate. To mandrel-exposed portions at both ends of the unvulcanized rollers 22, pressure is applied by holding members 33, and supporting plates which support the holding members 33 are moved in the lengthwise direction.

The pressure contact member 29 may internally be provided with a heater so as to be beforehand heated to vulcanization temperature, or the whole apparatus may be installed in a thermostatic chamber so that the whole can be kept at vulcanization temperature, or the both may be done simultaneously. Also, there may be a difference in temperature between the pressure contact member and the environment in which the apparatus is installed.

The guides 31 are each also provided with a slit 32 parallel to the pressure contact member 29 so that each pressure contact unit can be moved along the guides on the both sides. This each pressure contact unit is moved in parallel to the pressure contact member 29. Thus, the unvulcanized rollers 22 are followingly rotated, and the vulcanization and surface smoothing proceed. As shown in FIG. 5B, at this slit portion, a plurality of units may be provided at constant intervals. This is suited for a case in which a number of rolls are continuously treated. Incidentally, the guides 31 are regulated by the holding members 33 so that the mandrels do not move right and left. Members which support the mandrels can move up and down with ease in accordance with changes in external diameter of the unvulcanized rollers. In FIGS. 5A and 5B, reference numeral 34 denotes a regulation member; and 35, a weight.

The weight may appropriately be controlled in accordance with the viscosity of materials, and may be used in its own weight depending on the weight of the mandrel. However, in view of safety as well, a load of 100 g or more may preferably be applied on each side. The load may be applied by any means such as air pressure. The load may also be applied simultaneously on a number of rollers.

The pressure contact member may also be present in plurality, and the unvulcanized rubber composition layer on the mandrel may be held between the plurality of pressure contact members. Where the pressure contact members are brought into pressure contact with the unvulcanized roller in this way from multiple directions, any pressure need not be applied to the end portions of the mandrel, and the unvulcanized roller may only be so held as not to be shifted.

In the case when the unvulcanized roller is brought into pressure contact with a plurality of pressure contact members, the area of contact with the pressure contact members comes larger, and hence the temperature of the unvulcanized roller can more quickly be made higher. In regard to how to choose the multiple directions, top-and-bottom or horizontal face-to-face directions are favorable taking account of symmetry. Where the pressure contact rotation vulcanization is carried out using two plates of pressure contact members provided face to face, a more highly precise roller can be obtained because any bend of mandrel that may come about when the pressure is applied to both ends of the mandrel and any external-diameter imperfection caused by deflection of the mandrel can be kept from coming about.

Figure 6A:
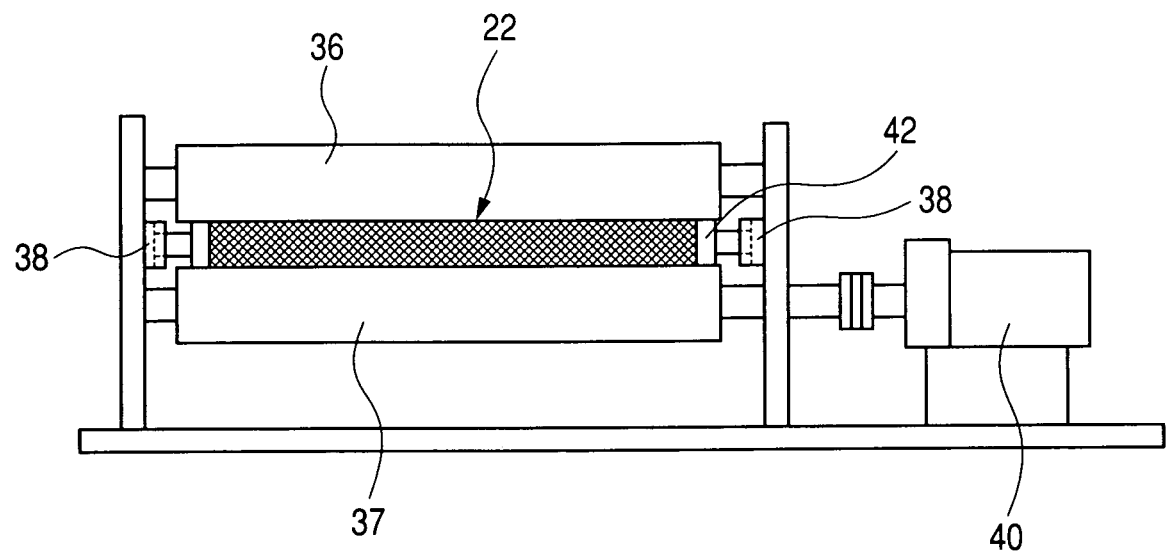
FIG. 6A is a front view of a pressure contact vulcanizing apparatus having two pressure contact members for carrying out the present invention.
Figure 6B:
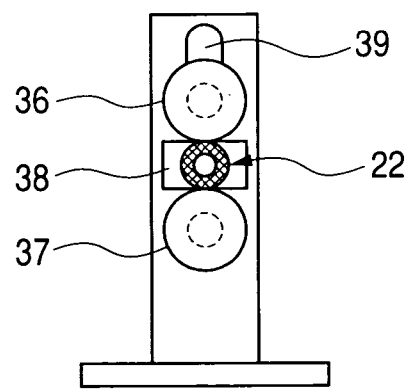
FIG. 6B is a schematic side view of the vulcanizing apparatus shown in FIG. 6A.

FIGS. 6A and 6B show an example of modification of the pressure contact vulcanizing apparatus shown in FIGS. 4A and 4B, which differs from the FIGS. 4A and 4B pressure contact vulcanizing apparatus in that two roller-shaped forms (pressure contact members) 36 and 37 are used. FIG. 6A is a plan view, and FIG. 6B a side view.

In this pressure contact vulcanizing apparatus, the unvulcanized roller 22 is held between the pressure contact members 36 and 37 from top and bottom, and pressure is applied by pressure contact member 36's own weight. The unvulcanized roller 22 is positionally set by a holding member 38 which holds the roller so that its mandrel is not shifted except up-and-down directions.

The pressure contact member 36 is readily up and down movable, and its both ends are held by slits 39 so as not to be shifted in other directions. To drive this apparatus, the pressure contact member 37 is rotated by a motor 40, where the unvulcanized roller 22 is followingly rotated, and the pressure contact member 36 is further followingly rotated by the rotation of the unvulcanized roller 22. In FIG. 6A, reference numeral 42 denotes a regulation member.

In the case when the pressure is applied by the pressure contact member as also shown in FIG. 6A, it is preferable to provide the regulation member so that the unvulcanized roller 22 may not deform beyond the predetermined size. In the case when the pressure contact member has a cylindrical shape, hollow-cylindrical rollers serving as regulation members are inserted to both end portions of the mandrel, in the state of which the pressure may be applied. This can achieve more stable external sizing of the roller 22. In the case when the pressure contact member has a flat-plate shape, bumps parallel to the plane of the pressure contact member may be provided on its both ends so that the mandrel may not come close to the pressure contact member beyond a certain level.

A process for manufacturing a crown-shaped roller member is described below.

In order that the roller member to be obtained is made to have a crown shape or a reverse-crown shape, which differs in diameter in the lengthwise direction, a pressure contact member may be used whose shortest distance from the mandrel axis passing through the centers of both end faces of the mandrel to the pressure contact member differs at positions in the lengthwise direction of the mandrel. The diameter of the roller in its lengthwise direction changes with the pressure contact rotation, so that a shape with desired external diameters can be obtained.

Stated specifically, in the case when the pressure contact member has a cylindrical shape, a pressure contact member having a reverse-crown shape (the diameter at the middle is smaller than the diameter at end portions) or a crown shape (the diameter at the middle is larger than the diameter at end portions) may be used to carry out the vulcanization.

Figure 7A:
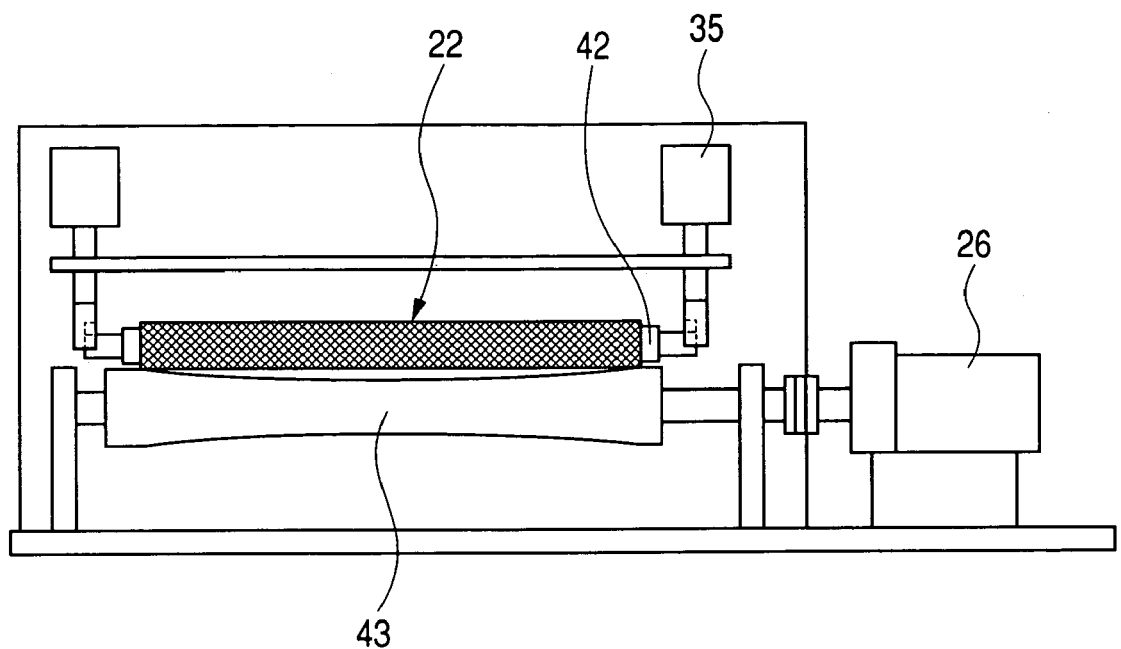
FIG. 7A is a front view of a pressure contact vulcanizing apparatus having a cylindrical pressure contact member for carrying out the present invention.
Figure 7B:
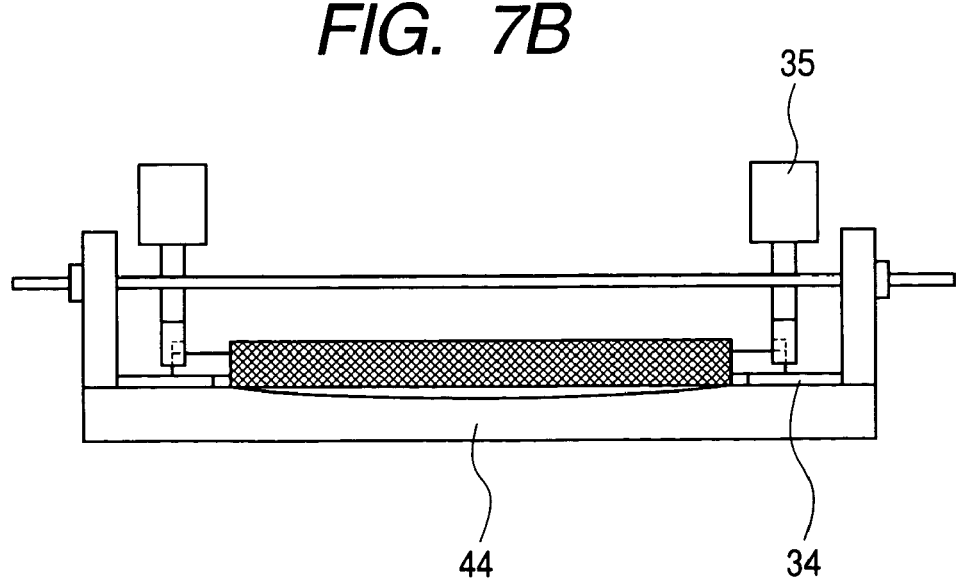
FIG. 7B is a front view of a pressure contact vulcanizing apparatus having a flat-plate pressure contact member for carrying out the present invention.

FIG. 7A is a front view of a pressure contact vulcanizing apparatus having a cylindrical pressure contact member. FIG. 7B is a front view of a pressure contact vulcanizing apparatus having a flat-plate pressure contact member.

As shown in FIG. 7A, a cylindrical pressure contact member 43 has a reverse-crown shape, which has a smaller diameter at the middle and larger diameters at both end portions. Also, as shown in FIG. 7B, a flat-plate pressure contact member 44 differs in thickness at positions in the lengthwise direction, in the cross section of the pressure contact member in the lengthwise direction of the roller.

In addition, besides the changing of the shape of the pressure contact member, a method may also be employed in which the roller and the pressure contact member are brought into pressure contact with each other providing an angle between the former's central axis and the latter's central axis.

Where the unvulcanized rubber composition has a low fluidity, the roller having a crown shape or a reverse-crown shape in a good precision can not be formed in some case even when the pressure contact vulcanizing apparatus shown in FIG. 7A or 7B is used.

In such a case, a difference in external diameter may beforehand be provided on the unvulcanized rubber composition in its lengthwise direction when it is made to cover the periphery of the mandrel, and the unvulcanized roller may be put to pressure contact rotation while applying a load on both ends of the mandrel. Thus, the crown shape can be formed in a good precision.

The reason why the crown shape is formed is that the unvulcanized roller beforehand provided with a difference in external diameter is used and a load is applied to both ends of the mandrel, whereupon the mandrel deflects, and a shape corresponding to the shape of the mandrel having deflected can be obtained. Accordingly, the pressure contact member may be a member having substantially the same diameter in its lengthwise direction, and the crown shape can be controlled by increasing or decreasing the load to be applied to the mandrel.

Where the roller member to be formed is endowed with conductivity and is used as a charging roller disposed in contact with the surface of an electrophotographic photosensitive member, the pressing force applied to the pressure contact member may be controlled within the range of from 0.5 time to 2 times the pressing force at which the charging roller is to be kept in pressure contact with the photosensitive member, and the unvulcanized roller may be put to pressure contact rotation in the state of contact that is closed to the actual state of use. This enables a uniform state of contact to be readily obtained also when the charging roller is kept in pressure contact with the photosensitive member.

Moreover, the use of this method makes it unnecessary to provide the pressure contact member with the difference in external diameter in order to obtain the crown shape or reverse-crown shape, and hence the apparatus constitution can be simplified.

To form the unvulcanized roller beforehand provided with the difference in external diameter, usable are a method in which, in the step of forming the unvulcanized roller as shown in FIG. 3A, the number of revolutions of the feed roller 20 through which the mandrel 11 is inserted to the crosshead 19 of the extruder is periodically changed, and a method in which the number of revolutions of the extruder is periodically changed, any of which may be used.

The unvulcanized rubber composition may have so low a fluidity that the roller having a crown shape in a good precision can not be formed. In such a case, when the unvulcanized rubber composition layer is formed around the mandrel, one having been extruded beforehand providing the difference in external diameter in the lengthwise direction may be put to pressure contact rotation while applying a load on both ends of the mandrel. This enables formation of the crown shape in a good precision.

The shape of the pressure contact member may be flat, without providing the flat-plate pressure contact member with a concave surface by changing the distance from the mandrel to the former's surface. In particular, in order to obtain the crown shape or reverse-crown shape in a good precision, it is preferable that an unvulcanized roller beforehand having a shape close to the desired shape is formed, and a load is symmetrically applied to both sides or in three directions, using a form having the desired shape.

In the case when a number of roller members are simultaneously manufactured, when the cylindrical pressure contact member is used, the cylindrical pressure contact member must be prepared in the number corresponding thereto, and, when the flat-plate pressure contact member is used, a distance must be prepared which corresponds to the time taken for the unvulcanized rollers to be vulcanized while being rotated. This may make the apparatus large in size.

In the present invention, a beltlike member may be used as the pressure contact member and it may be driven and rotated by a roller or the like, where a number of unvulcanized rollers may be pressed against that beltlike member. This can make the apparatus simple.

As materials for the beltlike member, any materials may be used as long as they have strength high enough to endure its stretching. Metals such as stainless steel and nickel having good thermal conductivity are particularly preferred.

Figure 8A:
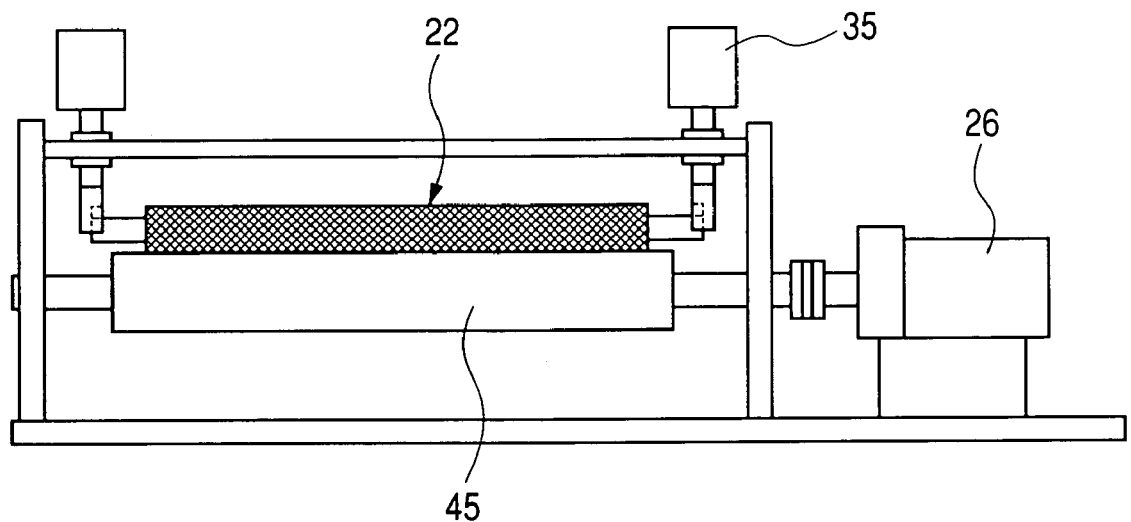
FIG. 8A is a front view of a pressure contact vulcanizing apparatus having a beltlike pressure contact member for carrying out the present invention.
Figure 8B:
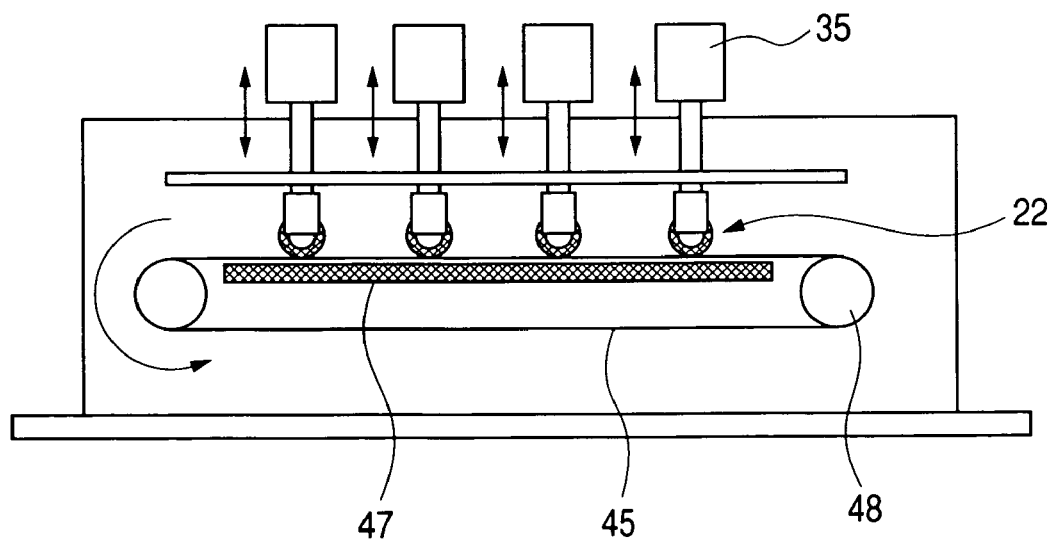
FIG. 8B is a schematic side view of the vulcanizing apparatus shown in FIG. 8A.

A pressure contact vulcanizing apparatus in which the pressure contact member used in the present invention is a beltlike member stretched over rollers is shown in FIGS. 8A and 8B. Since a belt 45 has a low rigidity, a reinforcing member 47 as shown in FIG. 8B may be used. Roller members having the crown shape or reverse-crown shape may also be obtained by changing the shape of a drive roller 48 or that of the reinforcing member 47.

Even where the pressure contact member has no protrusions or the like and holes are made in a large number in its smooth plane, the holes may be so arranged that, with rotation, they come into contact with the unvulcanized roller surface periodically in its areas where no holes are present. This can provide roller members finally having relatively good surface roughness.

Where, e.g., the pressure contact vulcanizing apparatus is heated with hot air, the use of such a pressure contact member in the pressure contact face of which the holes are made is preferable in some cases because it can bring an improvement in breathability to raise the temperature quickly.

In regard to the heating of the unvulcanized roller, any method may be used in combination with the pressure contact rotation vulcanization, such as hot-air furnace heating, vulcanizer heating, hot-platen heating, far or near infrared ray heating, and induction heating. It is preferable to heat the unvulcanized roller at a temperature of from 140° C. or more to 220° C. or less for 10 minutes or more to 120 minutes or less.

The unvulcanized roller need not be continued to be put to the pressure contact rotation to the last of vulcanization, and may be done until the vulcanization proceeds to make the shape retained. After that, it may be heated in a hot-air furnace or the like in the state it is not put to the pressure contact rotation.

Incidentally, the above roller member manufacturing process according to the second embodiment of the present invention is not a process used only in the manufacture of roller members involving the possibility of having voids in the elastic layer. It may also be used in the manufacture of roller members from which the possibility of having voids in the elastic layer has been eliminated by devising the constitution of the unvulcanized rubber composition or devising how to form the unvulcanized roller. As one of effects brought when the roller member manufacturing process according to the second embodiment of the present invention is applied to the manufacture of such roller members, what is given is that it is unnecessary to polish the elastic layer peripheral surface afresh after the unvulcanized roller has been vulcanized. This enables achievement of the reduction of manufacturing cost for roller members.

(4) Re Multi-Layer Roller Member:

A case is described below in which the method in the present invention is applied in regard to the formation of a roller member having two or more elastic layers as a second embodiment of the roller member.

In the case of an unvulcanized roller having two or more layers containing the unvulcanized rubber composition, as well, it may be put to the rotation vulcanization under pressure contact like the case of the single layer, whereby a highly precise roller member can be obtained which is free of any defects such as surface void openings and has good surface roughness. In the case when the roller member having two or more elastic layers is manufactured by using this method, different materials may be used in a plurality of layers, and this enables easy control of characteristics such as hardness and resistance while keeping good surface roughness and external-diameter precision. Hence, characteristics required as the roller member is also improved.

To form on the mandrel two layers containing the unvulcanized rubber composition, used is a method in which the two layers are simultaneously formed using a double-layer extruder and a crosshead, or a method in which a single-layer unvulcanized rubber composition layer is formed and thereafter a rubber layer is afresh formed using a crosshead to form two layers.

Figure 10:
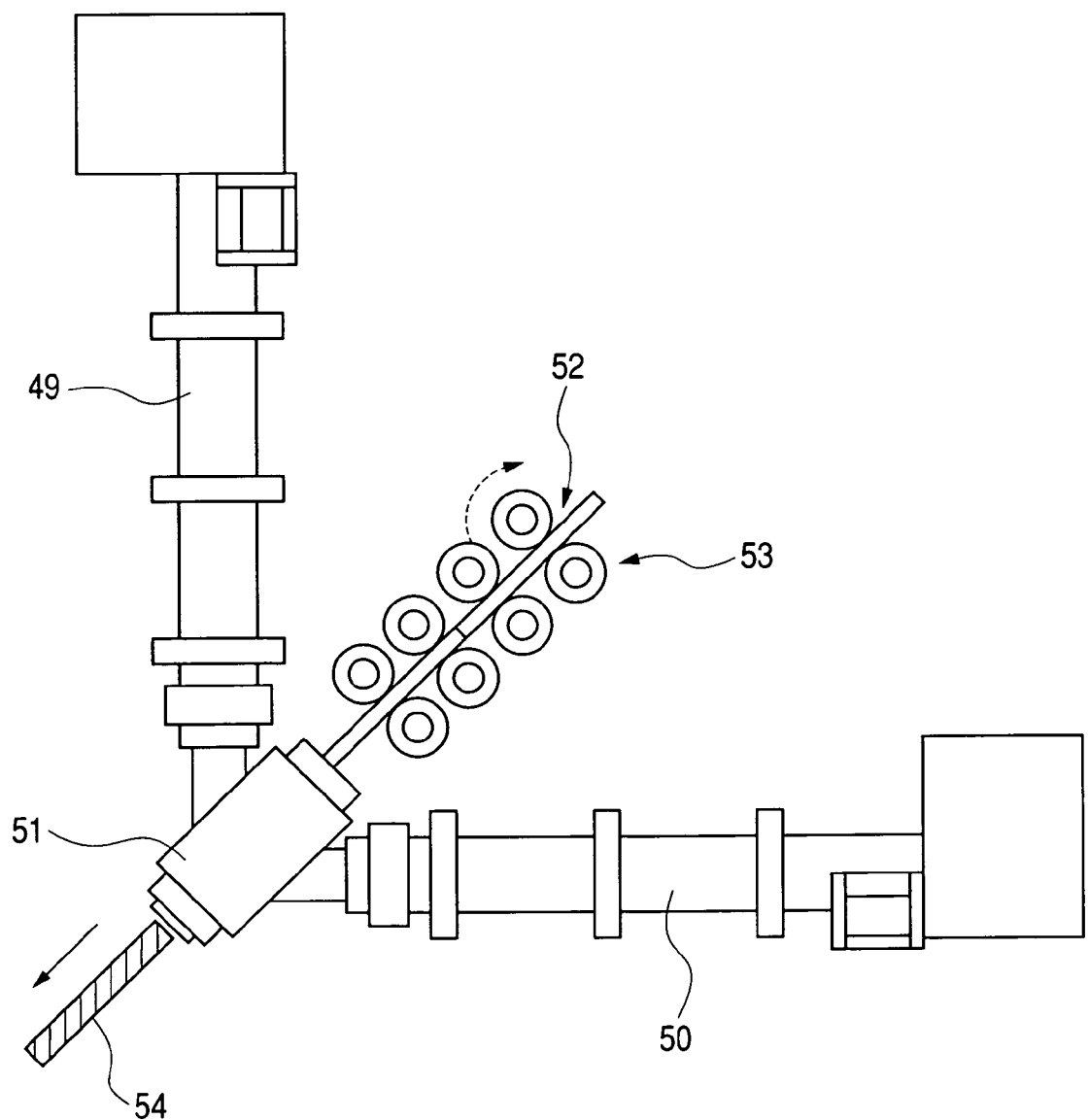
FIG. 10 is a schematic sectional view of a double-layer extruder used in manufacturing a roller member according to another embodiment of the present invention.

FIG. 10 diagrammatically illustrates an example of the double-layer extruder and crosshead.

In FIG. 10, reference numerals 49 and 50 denote extruders, which are used for an upper layer on the outside and a lower layer on the inside, respectively. The double-layer extruder has a crosshead 51, to which a mandrel 52 fed continuously by feed rollers 53 can be inserted from the back of the crosshead. The crosshead 51 has flow paths through which the mandrel is covered around it in a cylindrical form, with rubbers sent from the extruders for upper layer and lower layer, and a roller 54 having two unvulcanized layers is extruded in the direction shown in the drawing. After it has been extruded, it is appropriately cut and separated for each mandrel, and is sent to the step of pressure contact vulcanization.

Where a further high precision is required, two or more unvulcanized rubber layers may be provided and formulation may be used such that the Mooney viscosity of the outside upper layer is lower than the Mooney viscosity of the inside lower layer. This makes a flow tend to take place concentratedly in the lower-Mooney upper layer, and hence the voids also tend to be crushed. This can improve surface roughness and external-diameter precision.

In order to obtain a roller member having especially low hardness, a foamed layer is also required. However, a foam may have a large roughness because cells may come exposed to its surface.

Moreover, where a low-hardness foam is handled, the unvulcanized matter at the start of foaming has so weak rigidity that it may loose its shape especially in the case of high foaming. Accordingly, where it goes through the step of pressure contact rotation with heating, a non-foamed layer may be provided on the peripheral surface of the foamed layer, whereby a foamed roller having good surface roughness and low hardness can be obtained. That is, such a double-layer unvulcanized roller is beforehand formed, and then put to the rotation vulcanization under pressure contact so that the lower-layer unfoamed layer is foamed and the control of the surface roughness of the upper-layer non-foamed layer and the correction of external diameter of the roller can simultaneously be made. Thus, the double-layer foamed roller can be formed.

A member which controls the distance between the pressure contact member and the mandrel may further be used in order to stabilize the external diameter after foaming.

Figure 11A:
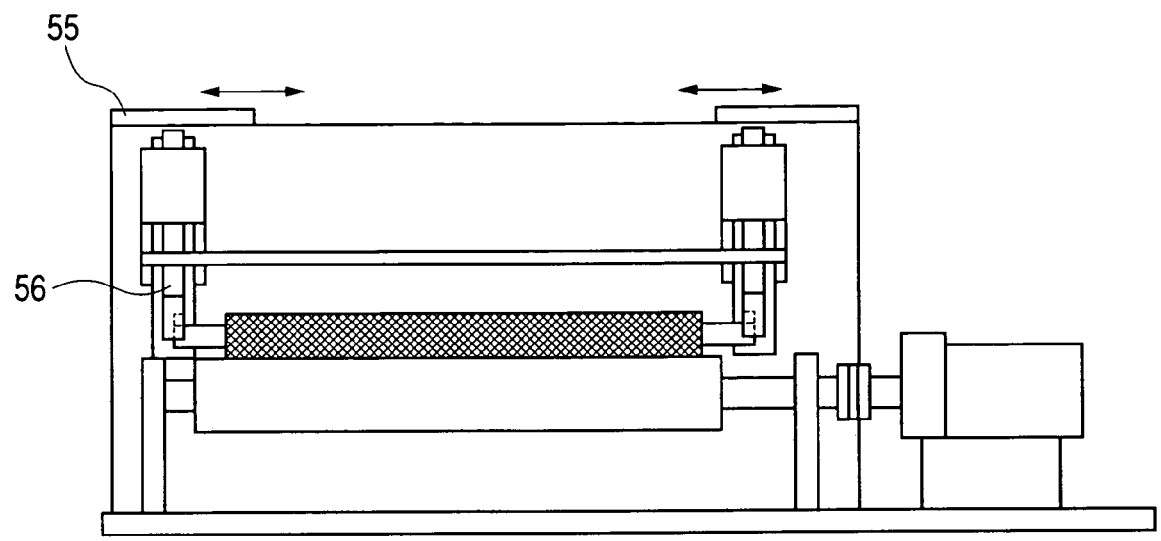
FIG. 11A is a front view of a pressure contact vulcanizing apparatus having a foaming control member for carrying out the present invention.
Figure 11B:
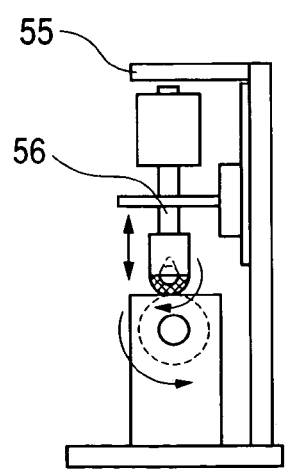
FIG. 11B is a schematic side view of the vulcanizing apparatus shown in FIG. 11A.

FIGS. 11A and 11B diagrammatically illustrates an example of a control member 55. In the example shown in these drawings, a mandrel holding member 56 is so controlled that it does not come away from the pressure contact member beyond a certain extent, to control the distance between the mandrel and the pressure contact member. The external diameter may also be controlled by the control member in such a way that the unfoamed roller and the pressure contact member do not come into contact in an unfoamed state and they come into contact for the first time after foaming.

As described above, according to an embodiment of the present invention, a roller member can be obtained which has an elastic layer having superior surface properties in which, even though the voids are present in the elastic layer, they do not substantially affect surface properties, and can preferably be used in various electrophotographic members.

According to another embodiment of the present invention, the roller member which can preferably be used in various electrophotographic members can be manufactured at a low cost while tolerating the presence of voids in the elastic layer and in the state the surface properties are not affected by the voids.

EXAMPLES

The present invention is described below in greater detail by giving Examples. The present invention is by no means limited to these. In the following, "part(s)" refers to "part(s) by weight".

Example 1

As the unvulcanized rubber composition, based on 100 parts of epichlorohydrin-ethylene oxide-acrylglycidyl ether terpolymer (CG102, available from Daiso Co., Ltd.), 5 parts of zinc oxide (Zinc Oxide JIS2, available from Seido Chemical Industry Co.), 60 parts of calcium carbonate (SILVER W, available from Shiraishi Calcium Kaisha, Ltd.), 10 parts of carbon black (SEAST SO, available from Tokai Carbon Co., Ltd.), 1 part of tetrabutylammonium perchlorate as an ion conductive agent, 1 part of stearic acid as a processing aid, 5 parts of adipic acid ester (POLYCIZER W305ELS, available from Dainippon Ink & Chemicals, Inc.) as a plasticizer, 0.5 part of sulfur as a vulcanizing agent and 2 parts of dipentamethylenethiurum tetrasulfide (NOCCELER, available from Ouchi-Shinko Chemical Industrial Co., Ltd.) as a vulcanization accelerator were mixed by means of an open roll. Mooney viscosity of this unvulcanized rubber composition was 42.

To form around the mandrel a layer of the unvulcanized rubber composition thus obtained, a die of 12 mm in internal diameter was set to the extruder shown diagrammatically in FIG. 3A, and the crosshead was beforehand temperature-regulated at 60° C. Next, a mandrel of 6 mm in diameter was prepared, and was extruded together with the rubber composition to form around the mandrel a cylindrical unvulcanized rubber composition layer. Thereafter, a surplus unvulcanized rubber composition layer at each end portion was so cut and removed that the unvulcanized rubber composition layer was 224 mm in length, to produce two unvulcanized rollers.

Next, each unvulcanized roller was put to pressure contact vulcanization using the pressure contact vulcanizing apparatus shown diagrammatically in FIGS. 4A and 4B. The pressure contact vulcanizing apparatus was covered around it with a heat insulating plate except the part of a motor, in the state of which the whole was beforehand heated by hot air to afford an atmosphere of 180° C. Using this apparatus, pressure contact vulcanization was carried out for 30 minutes to form each elastic layer 12 to obtain two roller members. Incidentally, in the pressure contact vulcanizing apparatus, a load was applied to mandrel both ends using a weight of 1 kg on each side. As the pressure contact member, a roller type was used which was made of stainless steel, 240 mm in breadth (length), 30 mm in diameter and 1.6 μm in Rz jis 94. Also, the weight shown by reference numeral 28 in FIG. 4A was 1 kg in weight on each side, with which the pressing force was applied to the roller type, unvulcanized roller.

Using one of the two roller members thus obtained, its voids were observed and measured. To measure the average internal diameter and aspect ratio of the voids, the roller member was cut with a sharp edged tool in the direction falling at right angles with the lengthwise direction, at the middle of the roller member in its breadth (lengthwise) direction and at four spots at intervals of 20 mm toward the both ends from the middle, i.e., at nine spots in total. Among voids observed on the cut surfaces, their size was measured in respect of all voids positioned in the vicinity of each surface.

As the result, all voids present up to 33% inside from the surface of the roller member with respect to the thickness of its elastic layer were within the ranges of from 10 μm to 400 μm in average internal diameter and from 1.3 to 10.0 in aspect ratio. Also, the angle θ was 30° or less. In respect of these parameters, averages in all voids were each as follows:

Average internal diameter: 42 μm.
Aspect ratio: 2.0.
Angle θ: 21°.

On the other roller member, its surface roughness (Rz jis 94), external-diameter precision and run-out precision were measured. As the external-diameter precision, using a non-contact laser external-diameter measuring device (LS-5000), the external diameter of the roller member was measured on its both sides from the middle in its lengthwise direction and at four spots at intervals of 20 mm on each side. In regard to the run-out precision, using the same measuring device, the distance between the elastic-member roller and a reference rod provided in parallel to the roller at the middle in its lengthwise direction was measured rotating the roller.

The results of these are shown in Tables 1 and 2 below. As to the external-diameter precision and the run-out precision, these are expressed by (maximum value)−(minimum value).

Next, in order to use the roller member according to this Example as a charging roller, for the purpose of reducing stickiness of the surface, the roller member was irradiated with an ultraviolet lamp of about 250 nm in wavelength for 3 minutes to carry out surface treatment. Thereafter, image evaluation was made using such an apparatus as shown below. Incidentally, the irradiation with ultraviolet rays was carried out feeding the roller on a conveyer in the state of being rotated, and from the top and the bottom, using lamps provided in parallel to the roller.

An electrophotographic laser beam printer used in this test is an apparatus for A4 lengthwise printing, and has a recording medium process speed of 94 mm/sec and an image resolution of 600 dpi. Its photosensitive member is a photosensitive drum of a reverse development system, constituted of an aluminum cylinder and provided thereon with a photosensitive layer of 18 μm in layer thickness by coating. Its outermost layer is a charge transport layer formed of a modified polycarbonate as a binder resin. Toner is a polymerization toner formed of base particles of a random copolymer of styrene and butyl acrylate, which contain a wax in cores and also a charge control agent, a coloring matter and so forth and are further provided on their surfaces with polyester thin layers by polymerization, and to which fine silica particles have externally been added. This toner has a glass transition temperature of 63° C. and a volume-average particle diameter of 6 μm.

To make image evaluation, halftone images (images having horizontal lines of one-dot width and two-dot intervals in the direction perpendicular to the rotational direction of the photosensitive member) were reproduced. Faulty images due to voids, appearing as black dots for each pitch of the charging roller, and faulty images due to stains were examined to make evaluation according to the following evaluation criteria.

Evaluation Criteria
A: Any black dotlike faulty images are not perceivable.
B: Black dots of 0.3 mm or less in size are seen, and are in a number of less than 3.
C: Black dots of more than 0.3 mm in size are seen, or three or more of black dots of 0.3 mm or less in size are seen.

As to the faulty images due to stains, the extent of faulty images appearing in black haze was examined on images after 500-sheet printing of the halftone images.

As the result, neither the faulty images due to voids nor the faulty images in black haze were seen to have occurred. The results of evaluation are shown together in Table 2.

Example 2

As the unvulcanized rubber composition, used was the same one as that in Example 1 except that the calcium carbonate (SILVER W, available from Shiraishi Calcium Kaisha, Ltd.) and the carbon black (SEAST SO, available from Tokai Carbon Co., Ltd.) were used in amounts changed to 45 parts and 5 parts, respectively. Mooney viscosity of this unvulcanized rubber composition was 32.

Thereafter, roller members were produced in the same manner as in Example 1.

On the roller members obtained, the state of voids, the surface roughness, the external-diameter precision and the run-out precision were measured in the same manner as in Example 1. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Example 3

In this Example, unvulcanized rollers were produced in the same manner as in Example 1.

Figure 9:
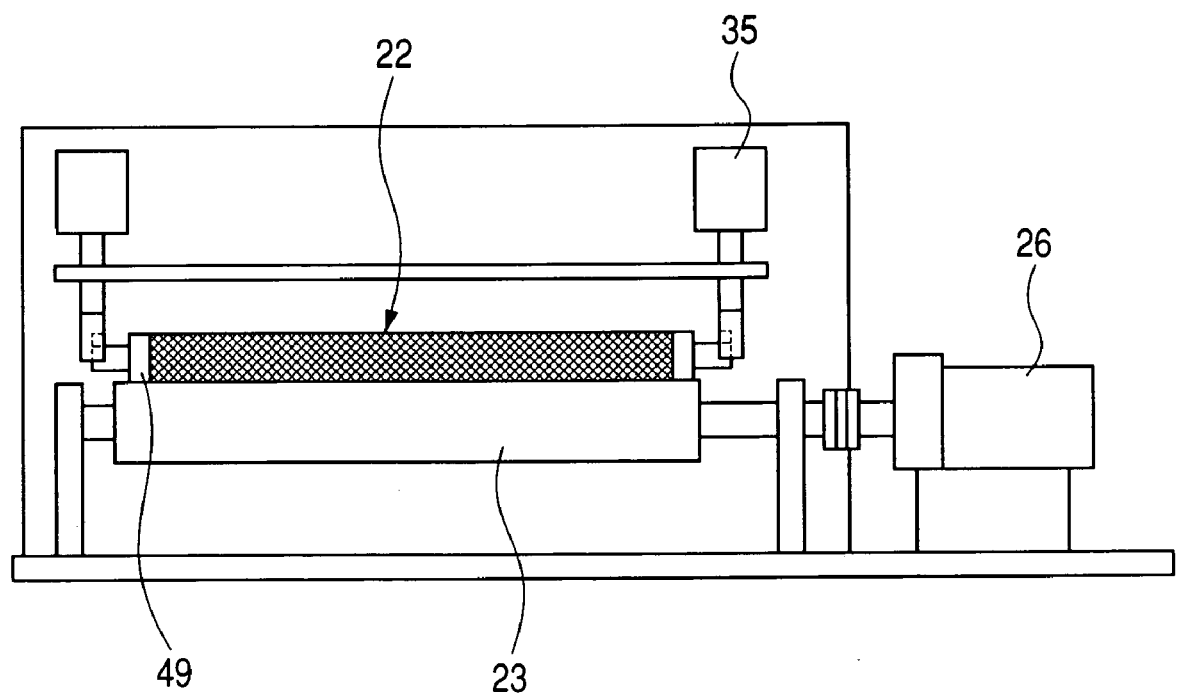
FIG. 9 is a front view of a pressure contact vulcanizing apparatus having a control member for carrying out the present invention.

Next, using the pressure contact vulcanizing apparatus shown diagrammatically in FIGS. 4A and 4B, roller members were produced in the same manner as in Example 1 except that a cylindrical control member shown diagrammatically by reference numeral 49 in FIG. 9 was added to carry out pressure contact vulcanization. Incidentally, the cylindrical control member was 11.5 mm in external diameter.

On the roller members obtained, the state of voids, the surface roughness, the external-diameter precision and the run-out precision were measured in the same manner as in Example 1. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Example 4

In this Example, unvulcanized rollers were produced in the same manner as in Example 1.

Next, roller members (elastic rollers) were produced in the same manner as in Example 2 except that the pressure contact vulcanizing apparatus shown diagrammatically in FIGS. 5A and 5B was used and the pressure contact vulcanization was carried out placing a flat-plate control member of 2.75 mm in thickness at the part corresponding to each end of the mandrel.

On the roller members obtained, the state of voids, the surface roughness, the external-diameter precision and the run-out precision were measured in the same manner as in Example 1. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Example 5

In this Example, unvulcanized rollers were produced in the same manner as in Example 1.

Next, the pressure contact vulcanizing apparatus shown diagrammatically in FIGS. 6A and 6B, in which the unvulcanized roller is put to pressure contact vulcanization using the two pressure contact members 36 and 37 simultaneously, was used and the cylindrical control member shown diagrammatically by reference numeral 42 in FIG. 6A, having an external diameter of 11.5 mm, was added to both ends of the mandrel to carry out pressure contact vulcanization to obtain roller members. Incidentally, the upper pressure contact member was controlled to be 2 kg in weight.

On the roller members obtained, the state of voids, the surface roughness, the external-diameter precision and the run-out precision were measured in the same manner as in Example 1. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Example 6

In this Example, unvulcanized rollers were produced in the same manner as in Example 1.

Next, the pressure contact vulcanizing apparatus shown diagrammatically in FIG. 7A, which makes use of the pressure contact member 43 having different diameters in the lengthwise direction, was used and the cylindrical control member shown diagrammatically by reference numeral 42 in FIG. 7A, having an external diameter of 11.5 mm, was added to both ends of the mandrel to carry out pressure contact vulcanization to obtain roller members. Incidentally, the upper pressure contact member was controlled to be 2 kg in weight.

Incidentally, the pressure contact member 43 is concentric at every section falling at right angles with its lengthwise direction, and is provided with a difference in external diameter of 0.1 mm between the middle and end portions of its part with which the rubber layer of the unvulcanized roller comes into contact, having a smaller diameter at the middle. Its surface having the difference in external diameter from the middle toward both end portions is in a shape that forms a gentle single arc.

On the roller members obtained, the state of voids, the surface roughness, the external-diameter precision and the run-out precision were measured in the same manner as in Example 1. In measuring the external-diameter precision of the roller member obtained, the roller was found to be an elastic roller having a crown shape smaller in diameter at end portions than at the middle. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Incidentally, as to the value of the external-diameter precision in this Example, it can not be compared alike with those of other Examples because the roller has a crown shape, and hence is not shown in Table 2.

Example 7

In this Example, unvulcanized rollers were produced in the same manner as in Example 3 except that the mandrel extrusion speed was changed at the time of extrusion so as to be made to have a crown shape having difference in external diameter.

The difference in external diameter was so provided that the unvulcanized rollers had a shape in which the diameter decreased from the middle toward both ends. The difference in external diameter between the middle and the end portions was set to about 0.1 mm.

Using the unvulcanized rollers obtained, roller members were produced in the same manner as in Example 3.

On the roller members obtained, the state of voids, the surface roughness, the external-diameter precision and the run-out precision were measured in the same manner as in Example 1. In measuring the external-diameter precision of the roller member obtained, the roller was found to have a crown shape becoming gently smaller in external diameter from the middle toward end portions, where small external-diameter non-uniformity seen at the stage of unvulcanized roller was found disappeared. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Incidentally, as to the value of the external-diameter precision in this Example, it can not be compared alike with those of other Examples because the roller has a crown shape, and hence is not shown in Table 2.

Example 8

In this Example, unvulcanized rollers were produced in the same manner as in Example 4 except that the mandrel extrusion speed was changed at the time of extrusion so as to be made to have a crown shape having difference in external diameter.

The difference in external diameter was so provided that the unvulcanized rollers had a shape in which the diameter decreased from the middle toward both ends. The difference in external diameter between the middle and the end portions was set to about 0.1 mm.

Using the unvulcanized rollers obtained, roller members were produced in the same manner as in Example 4.

On the roller members obtained, the state of voids, the surface roughness, the external-diameter precision and the run-out precision were measured in the same manner as in Example 1. In measuring the external-diameter precision of the roller member obtained, the roller was found to have a crown shape becoming gently smaller in external diameter from the middle toward end portions, where small external-diameter non-uniformity seen at the stage of unvulcanized roller was found disappeared. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Incidentally, as to the value of the external-diameter precision in this Example, it can not be compared alike with those of other Examples because the roller has a crown shape, and hence is not shown in Table 2.

Example 9

In this Example, unvulcanized rollers were produced in the same manner as in Example 1.

Next, roller members were produced in the same manner as in Example 1 except that the pressure contact vulcanizing apparatus shown diagrammatically in FIGS. 8A and 8B was used, which makes use of a belt as the pressure contact member. In FIGS. 8A and 8B, a pressure contact member 45 is a metallic belt of 50 μm in thickness, made of stainless steel. Reference numeral 47 denotes a drive roller which drives the belt; and 48, a reinforcing member.

On the roller members obtained, the state of voids, the surface roughness, the external-diameter precision and the run-out precision were measured in the same manner as in Example 1. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Example 10

In this Example, unvulcanized rollers were produced in the same manner as in Example 1.

Next, using the pressure contact vulcanizing apparatus shown diagrammatically in FIGS. 4A and 4B, roller members were produced in the same manner as in Example 3 except that a plate in which holes of 2 mm in diameter were uniformly made at intervals of 3 mm was worked into a cylindrical shape and was used as the pressure contact member.

On the roller members obtained, the state of voids, the surface roughness, the external-diameter precision and the run-out precision were measured in the same manner as in Example 1. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Example 11

As the unvulcanized rubber composition, used was the same one as that in Example 1 except that the carbon black was not used and the calcium carbonate (SILVER W, available from Shiraishi Calcium Kaisha, Ltd.) and the adipic acid ester (POLYCIZER W305ELS, available from Dainippon Ink & Chemicals, Inc.) as a plasticizer were used in amounts changed to 30 parts and 20 parts, respectively. Mooney viscosity of this unvulcanized rubber composition was 14.

Thereafter, roller members were produced in the same manner as in Example 1.

On the roller members obtained, the state of voids, the surface roughness, the external-diameter precision and the run-out precision were measured in the same manner as in Example 1. Although the surface roughness and the external-diameter precision were improved, compared with those in Comparative Example 1, the roller member was found to have stained with toner and so forth in horizontal lines after printing on 6,000 sheets, but on a level of no problem in practical use. The results of measurement are shown in Tables 1 and 2, and the results of evaluation in Table 2 together.

Example 12

As the unvulcanized rubber composition, used was the same one as that in Example 1 except that the plasticizer adipic acid ester (POLYCIZER W305ELS, available from Dainippon Ink & Chemicals, Inc.) was not used and the calcium carbonate (SILVER W, available from Shiraishi Calcium Kaisha, Ltd.) and the carbon black (SEAST SO, available from Tokai Carbon Co., Ltd.) were used in amounts changed to 90 parts and 20 parts, respectively. Mooney viscosity of this unvulcanized rubber composition was 56.

Thereafter, roller members were produced in the same manner as in Example 1.

On the roller members obtained, the state of voids, the surface roughness, the external-diameter precision and the run-out precision were measured in the same manner as in Example 1. Image evaluation was made in the same manner as in Example 1. As the result, density non-uniformity occurred slightly after printing on 6,000 sheets, but on a level of no problem in practical use. The results of measurement are shown in Tables 1 and 2, and the results of evaluation in Table 2 together.

Example 13

Roller members were produced in the same manner as in Example 1 except that, in order to form the unvulcanized rubber composition layer around the mandrel, a die of 13 mm in internal diameter was used in the extruder shown diagrammatically in FIG. 3A.

The roller members thus obtained were shape-controlled by means of a cylindrical polishing machine to have an external diameter of 12 mm to obtain roller members.

On the roller members obtained, the state of voids, the surface roughness, the external-diameter precision and the run-out precision were measured in the same manner as in Example 1. Image evaluation was made in the same manner as in Example 1. As the result, one to two faulty images due to voids were seen, but were so small as to be on a level of no problem in practical use. Also, the faulty images in black haze were not seen to have occurred even after printing on 6,000 sheets. The results of measurement are shown in Tables 1 and 2, and the results of evaluation in Table 2 together.

Example 14

In this Example, unvulcanized rollers were produced in the same manner as in Example 3 except that the mandrel extrusion speed was changed at the time of extrusion so as to be made to have a crown shape having difference in external diameter. The difference in external diameter was so provided that the unvulcanized rollers had a shape in which the diameter decreased from the middle toward both ends. The difference in external diameter between the middle and the end portions was set to about 0.1 mm.

Next, pressure contact vulcanization was carried out using the pressure contact vulcanizing apparatus shown diagrammatically in FIGS. 6A and 6B, provided that, as the pressure contact member, used was one having a cylindrical shape and has a reverse-crown shape, which has a smaller diameter at the middle and larger diameters at both end portions. The difference in external diameter between the middle and the end portions was set to about 0.1 mm.

The pressure contact vulcanizing apparatus was covered around it with a heat insulating plate except the part of a motor, in the state of which the whole was beforehand heated by hot air to afford an atmosphere of 180° C. Using this apparatus, pressure contact vulcanization was carried out for 30 minutes to obtain roller members. Incidentally, the weight of the pressure drum was controlled to 2 kg, and was brought to pressure contact with the unvulcanized roller from above to apply a load thereto.

On the roller members obtained, the state of voids, the surface roughness, the external-diameter precision and the run-out precision were measured in the same manner as in Example 1. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Example 15

In this Example, roller members each having a double-layer elastic layer were produced. As an unvulcanized rubber composition for the upper layer making the outside of the double-layer elastic layer, the same unvulcanized rubber composition as that in Example 1 was used.

As an unvulcanized rubber composition for the lower layer making the inside, it was compositionally the same as the unvulcanized rubber composition of Example 1 except that the plasticizer adipic acid ester (POLYCIZER W305ELS, available from Dainippon Ink & Chemicals, Inc.) was used in an amount changed to 10 parts. Mooney viscosity of this unvulcanized rubber composition was 32.

To form each unvulcanized rubber composition layer around the mandrel, a die of 12 mm in internal diameter was set in the double-layer extruder shown diagrammatically in FIG. 10, and the crosshead was beforehand temperature-regulated to 60° C. Next, the extrusion speeds of the two extruders of the double-layer extruder were so set that the upper layer came to a layer thickness of about 0.5 mm, and the unvulcanized rubber compositions were extruded together with a mandrel of 6 mm in diameter to form two unvulcanized rubber composition layers around the mandrel. Thereafter, surplus unvulcanized rubber composition layers at each end portion were so cut and removed that the unvulcanized rubber composition layers were each 224 mm in length, to obtain unvulcanized rollers.

In this Example, the unvulcanized rollers were produced to have a crown shape having difference in external diameter, by changing the mandrel extrusion speed at the time of extrusion. The difference in external diameter was so provided that the unvulcanized rollers had a shape in which the diameter decreased from the middle toward both ends. The difference in external diameter between the middle and the end portions was set to about 0.1 mm.

Thereafter, pressure contact vulcanization was carried out in the same manner as in Example 14 to produce double-layer roller members.

On the roller members obtained, the state of voids, the surface roughness, the external-diameter precision and the run-out precision were measured in the same manner as in Example 1. Here, the aspect ratio and so forth of voids were measured on the outermost layer. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Example 16

Roller members were produced in the same manner as in Example 15 except that the unvulcanized rubber composition for the upper layer and the unvulcanized rubber composition for the lower layer which were used in Example 15 were used for the lower layer and the upper layer, respectively.

On the roller members obtained, the state of voids, the surface roughness, the external-diameter precision and the run-out precision were measured in the same manner as in Example 1. Here, the aspect ratio and so forth of voids were measured on the outermost layer. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together. The roller member according to this Example was found to have been more improved in precision and surface roughness than that of Example 15.

Example 17

In this Example, double-layer roller members each lower layer of which was a foamed layer were produced. As an unvulcanized rubber composition for the upper layer making the outside, the same unvulcanized rubber composition as that in Example 1 was used.

As an unfoamed rubber composition for the lower layer making the inside, 120 parts of ethylene-propylene-diene terpolymer (EPT8075E, available from Mitsui Petrochemical Industries, Ltd.), 8 parts of Ketjen Black (KETJEN BLACK EC, available from Mitsubishi Chemical Corporation) as a conducting agent, 50 parts of SRF carbon black (ASAHI #35, available from Asahi Carbon Co., Ltd.), 20 parts of paraffin oil as a softening agent, 4 parts of azodicarbonamide (ADCA) and 4 parts of oxybisbenzenesulfonic acid hydrazide (OBSH) as blowing agents, 5 parts of zinc oxide and 1 part of stearic acid as vulcanization accelerating auxiliaries, 2 parts of sulfur as a vulcanizing agent, and 2 parts of mercaptobenzothiazole, 1 part of zinc dibutyldithiocarbamate (ZnBDC) and 1 part of tetramethylthiuram disulfide (TMTD) as vulcanization accelerators were mixed by means of an open roll. Mooney viscosity of this unfoamed rubber composition was 36.

To form layers of these unfoamed rubber composition and unvulcanized rubber composition around the mandrel, a die of 9.8 mm in internal diameter was set in the double-layer extruder shown diagrammatically in FIG. 10, and the crosshead was beforehand temperature-regulated to 60° C. Next, the extrusion speeds of the two extruders of the double-layer extruder were so set that the upper layer came to a layer thickness of about 0.5 mm, and these rubber compositions were extruded together with a mandrel of 6 mm in diameter to form an unfoamed rubber composition layer and an unvulcanized rubber composition layer around the mandrel. Thereafter, surplus unfoamed rubber composition layer and unvulcanized rubber composition layer at each end portion were so cut and removed that the unvulcanized rubber composition layer was 224 mm in length, to obtain unvulcanized rollers.

Next, vulcanization was carried out using the pressure contact vulcanizing apparatus shown diagrammatically in FIGS. 4A and 4B, provided that, as the pressure contact member, used was one having a cylindrical shape and has a reverse-crown shape, which has a smaller diameter at the middle and larger diameters at both end portions. The difference in external diameter between the middle and the end portions was set to 0.1 mm.

The pressure contact vulcanizing apparatus was covered around it with a heat insulating plate except the part of a motor, in the state of which the whole was beforehand heated by hot air to afford an atmosphere of 160° C. Using this apparatus, pressure contact vulcanization was carried out for 30 minutes using 300 g of a weight on each side to obtain roller members.

On the roller members obtained, the state of voids, the surface roughness, the external-diameter precision and the run-out precision were measured in the same manner as in Example 1. Here, the aspect ratio and so forth of voids were measured on the outermost layer. Image evaluation was also made in the same manner as in Example 1 As the result, neither the faulty images due to voids nor the faulty images in black haze were seen to have occurred. The results of measurement are shown in Tables 1 and 2, and the results of evaluation in Table 2 together.

Example 18

In this Example as well, double-layer roller members each lower layer of which was a foamed layer were produced. As an unvulcanized rubber composition for the upper layer, used was the same unvulcanized rubber composition as that in Example 1 except that the calcium carbonate (SILVER W, available from Shiraishi Calcium Kaisha, Ltd.) and the plasticizer adipic acid ester (POLYCIZER W305ELS, available from Dainippon Ink & Chemicals, Inc.) were used in amounts changed to 30 parts and 10 parts, respectively. As an unfoamed rubber composition for the lower layer, used was the same unfoamed rubber composition for the lower layer in Example 17 except that the blowing agents ADCA and OBSH were used in amounts changed to 8 parts and 8 parts, respectively. Mooney viscosity of this unfoamed rubber composition was 37.

To form layers of these unfoamed rubber composition and unvulcanized rubber composition around the mandrel, a die of 10.5 mm in internal diameter was set in the double-layer extruder shown diagrammatically in FIG. 10, and the crosshead was beforehand temperature-regulated to 60° C. Next, the extrusion speeds of the two extruders of the double-layer extruder were so set that the upper layer came to a layer thickness of about 0.5 mm, and these rubber compositions were extruded together with a mandrel of 6 mm in diameter to form an unfoamed rubber composition layer and an unvulcanized rubber composition layer around the mandrel. Thereafter, surplus unfoamed rubber composition layer and unvulcanized rubber composition layer at each end portion were so cut and removed that the unvulcanized rubber composition layer was 224 mm in length, to obtain unvulcanized rollers.

Next, vulcanization was carried out using the pressure contact vulcanizing apparatus shown diagrammatically in FIGS. 11A and 11B. In the apparatus shown in FIGS. 11A and 11B, the control member 55 has the function to keep the position of the mandrel holding member 56 not to come away from the pressure contact member beyond a certain extent so that the roller can not come to have a large external diameter beyond a certain extent after foaming. Incidentally, the control member 55 can be shifted right and left so as to be operable with ease when, e.g., detached. As the pressure contact member, used was one having a cylindrical shape and has a reverse-crown shape in which the diameter of the cylindrical-shape portion is larger by 0.1 mm at end portions than at the middle.

The pressure contact vulcanizing apparatus was covered around it with a heat insulating plate except the part of a motor, in the state of which the whole was beforehand heated by hot air to afford an atmosphere of 160° C. Using this apparatus, pressure contact vulcanization was carried out for 30 minutes using 200 g of a weight on each side to obtain roller members.

On the roller members obtained, the state of voids, the surface roughness, the external-diameter precision and the run-out precision were measured in the same manner as in Example 1. Here, the aspect ratio and so forth of voids were measured on the outermost layer. Image evaluation was also made in the same manner as in Example 1. As the result, neither the faulty images due to voids nor the faulty images in black haze were seen to have occurred. The results of measurement are shown in Tables 1 and 2, and the results of evaluation in Table 2 together.

Comparative Example 1

In this Example, unvulcanized rollers were produced in the same manner as in Example 13. Thereafter, without use of any pressure contact vulcanizing apparatus, the unvulcanized rollers were heated for 30 minutes in a hot-air furnace heated beforehand to 180° C., to produce elastic rollers. The elastic rollers obtained were further shape-controlled by means of a cylindrical polishing machine to have an external diameter of 12 mm to obtain roller members.

On the roller members obtained, the state of voids, the surface roughness, the external-diameter precision and the run-out precision were measured in the same manner as in Example 1. Thereafter, image evaluation was made in the same manner as in Example 1. As the result, black dotlike faulty images of 0.3 or more in size were seen in a large number. The results of measurement are shown in Tables 1 and 2, and the results of evaluation in Table 2 together.

Comparative Example 2

In this Example, unvulcanized rollers were produced in the same manner as in Example 1. Thereafter, without use of any pressure contact vulcanizing apparatus, the unvulcanized rollers were heated for 30 minutes in a hot-air furnace heated beforehand to 180° C., to produce roller members.

On the roller members obtained, the state of voids, the surface roughness, the external-diameter precision and the run-out precision were measured in the same manner as in Example 1. In regard to the external-diameter precision, the external diameter came large by 0.5 mm or more at both end portions of the rubber portion, showing a poor external-diameter precision. Incidentally, the run-out precision at the middle was 69 μm.

Thereafter, image evaluation was made in the same manner as in Example 1. As the result, because of the poor external-diameter precision, the part where the charging roller was unable to come into contact with the photosensitive member appeared as black faulty images, and it was unable to make any detailed image evaluation. The results of measurement are shown in Tables 1 and 2, and the results of evaluation in Table 2 together.

TABLE 1

| | | All-void average values | | |
|---|---|---|---|---|
| | Void shape observation results | Average internal diameter (μm) | Aspect ratio | Angle θ (°) |
| Example: | | | | |
| 1 | All voids in the vicinity of the surface are within the ranges of 10 to 400 μm in average internal diameter and 1.3 to 10.0 in aspect ratio, and at angle θ of 30° or less. | 42 | 2.0 | 21 |
| 2 | All voids in the vicinity of the surface are within the ranges of 10 to 400 μm in average internal diameter and 1.3 to 10.0 in aspect ratio, and at angle θ of 30° or less. | 36 | 2.7 | 27 |
| 3 | All voids in the vicinity of the surface are within the ranges of 10 to 400 μm in average internal diameter and 1.3 to 10.0 in aspect ratio, and at angle θ of 30° or less. | 44 | 2.2 | 18 |
| 4 | All voids in the vicinity of the surface are within the ranges of 10 to 400 μm in average internal diameter and 1.3 to 10.0 in aspect ratio, and at angle θ of 30° or less. | 39 | 2.3 | 21 |
| 5 | All voids in the vicinity of the surface are within the ranges of 10 to 400 μm in average internal diameter and 1.3 to 10.0 in aspect ratio, and at angle θ of 30° or less. | 40 | 2.6 | 24 |
| 6 | All voids in the vicinity of the surface are within the ranges of 10 to 400 μm in average internal diameter and 1.3 to 10.0 in aspect ratio, and at angle θ of 30° or less. | 38 | 2.0 | 23 |
| 7 | All voids in the vicinity of the surface are within the ranges of 10 to 400 μm in average internal diameter and 1.3 to 10.0 in aspect ratio, and at angle θ of 30° or less. | 36 | 2.3 | 21 |
| 8 | All voids in the vicinity of the surface are within the ranges of 10 to 400 μm in average internal diameter and 1.3 to 10.0 in aspect ratio, and at angle θ of 30° or less. | 39 | 2.3 | 25 |
| 9 | All voids in the vicinity of the surface are within the ranges of 10 to 400 μm in average internal diameter and 1.3 to 10.0 in aspect ratio, and at angle θ of 30° or less. | 33 | 2.3 | 26 |
| 10 | All voids in the vicinity of the surface are within the ranges of 10 to 400 μm in average internal diameter and 1.3 to 10.0 in aspect ratio, and at angle θ of 30° or less. | 41 | 2.1 | 27 |
| 11 | All voids in the vicinity of the surface are within the ranges of 10 to 400 μm in average internal diameter and 1.3 to 10.0 in aspect ratio, and at angle θ of 30° or less. | 30 | 3.2 | 31 |
| 12 | All voids in the vicinity of the surface are within the ranges of 10 to 400 μm in average internal diameter and 1.3 to 10.0 in aspect ratio, and at angle θ of 30° or less. | 51 | 1.8 | 16 |
| 13 | All voids in the vicinity of the surface are within the ranges of 10 to 400 μm in average internal diameter and 1.3 to 10.0 in aspect ratio, and at angle θ of 30° or less. | 47 | 2.1 | 13 |
| 14 | All voids in the vicinity of the surface are within the ranges of 10 to 400 μm in average internal diameter and 1.3 to 10.0 in aspect ratio, and at angle θ of 30° or less. | 41 | 2.5 | 18 |

TABLE 1-continued

| | Void shape observation results | All-void average values | | |
|---|---|---|---|---|
| | | Average internal diameter | Aspect ratio (μm) | Angle θ (°) |
| 15 | All voids in the vicinity of the surface are within the ranges of 10 to 400 μm in average internal diameter and 1.3 to 10.0 in aspect ratio, and at angle θ of 30° or less. | 38 | 2.3 | 19 |
| 16 | All voids in the vicinity of the surface are within the ranges of 10 to 400 μm in average internal diameter and 1.3 to 10.0 in aspect ratio, and at angle θ of 30° or less. | 33 | 2.8 | 22 |
| 17 | All voids in the vicinity of the surface are within the ranges of 10 to 400 μm in average internal diameter and 1.3 to 10.0 in aspect ratio, and at angle θ of 30° or less. | 36 | 1.8 | 17 |
| 18 | All voids in the vicinity of the surface are within the ranges of 10 to 400 μm in average internal diameter and 1.3 to 10.0 in aspect ratio, and at angle θ of 30° or less. | 30 | 2.1 | 21 |
| Comparative Example: | | | | |
| 1 | Voids in the vicinity of the surface do not especially stand crushed, and crush direction is difficult to judge. | 55 | 1.2 | —*1 |
| 2 | Voids in the vicinity of the surface do not especially stand crushed, and crush direction is difficult to judge. | 61 | 1.2 | —*1 |

*1 Directions differ so greatly that average value is not calculated.

TABLE 2

| | Mooney viscosity | Rz jis94 | External = diameter precision | Run-out precision | Image evaluation |
|---|---|---|---|---|---|
| Example: | | | | | |
| 1 | 42 | 4.7 | 23 | 45 | A |
| 2 | 31 | 2.8 | 18 | 42 | A |
| 3 | 42 | 3.1 | 17 | 22 | A |
| 4 | 42 | 3.3 | 19 | 28 | A |
| 5 | 42 | 1.8 | 16 | 17 | A |
| 6 | 42 | 4.1 | — | 36 | A |
| 7 | 42 | 2.9 | — | 31 | A |
| 8 | 42 | 3 | — | 33 | A |
| 9 | 42 | 3.2 | 29 | 47 | A |
| 10 | 42 | 9.2 | 29 | 49 | A |
| 11 | 14 | 1.8 | 28 | 54 | Stains in horizontal lines are seen, but on a level of no problem in practical use. |
| 12 | 59 | 13.1 | 31 | 49 | Slight density non-uniformity appears, but on a level of no problem in practical use. |
| 13 | 42 | 7.3 | 14 | 38 | Few faulty images due to voids are seen, but on a level of no problem in practical use. |
| 14 | 42 | 1.7 | — | 19 | A |
| 15 | UL 42 LL 32 | 1.8 | — | 21 | A |
| 16 | UL 32 LL 42 | 1.5 | — | 18 | A |
| 17 | UL 42 LL 36 | 4.9 | — | 31 | A |
| 18 | UL 28 LL 37 | 3.1 | — | 25 | A |
| Comparative Example: | | | | | |
| 1 | 42 | 7.5 | 13 | 35 | C |
| 2 | 42 | 31.2 | ≧500 | 69 | — |

UL: Upper layer;
LL: Lower layer

This application claims priority from Japanese Patent Application No. 2003-305846 filed on Aug. 29, 2003, which is hereby incorporated by reference herein.

What is claimed is:

1. A charging roller member comprising a mandrel and a conductive elastic layer therearound;
said charging roller member having a surface roughness Rz jis 94 of from 0.5 μm to 10 μm; and
said conductive elastic layer containing voids in the vicinity of its surface, said voids being empty space appearing on the cut surface of said conductive elastic layer when said elastic layer is cut in the direction that falls at a right angle with said mandrel,
wherein substantially all of said voids have an average internal diameter of from 10 μm to 400 μm and an aspect ratio of from 1.3 or more to 10.0 or less, and have an angle of from 0° or more to 45° or less, said angle being an acute angle between an axis that takes the maximum internal diameter of each of said voids and a tangent to a concentric circle of the roller member at the center of each of said voids.

* * * * *